US007868264B2

(12) United States Patent
Stemmle et al.

(10) Patent No.: US 7,868,264 B2
(45) Date of Patent: Jan. 11, 2011

(54) SYSTEM AND PROCESS FOR REDUCING NUMBER OF STOPS ON DELIVERY ROUTE BY IDENTIFICATION OF STANDARD CLASS MAIL

(75) Inventors: Denis J. Stemmle, Stratford, CT (US); Donald Caddy, Lafayette, IN (US); Douglas B. Quine, Bethel, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 217 days.

(21) Appl. No.: 11/632,921

(22) PCT Filed: Jul. 21, 2005

(86) PCT No.: PCT/US2005/025634

§ 371 (c)(1), (2), (4) Date: Dec. 2, 2008

(87) PCT Pub. No.: WO2006/014667

PCT Pub. Date: Feb. 9, 2006

(65) Prior Publication Data

US 2009/0078618 A1 Mar. 26, 2009

(51) Int. Cl.
*G06F 7/00* (2006.01)
*G06K 9/00* (2006.01)

(52) U.S. Cl. ........................ 209/584; 700/226; 209/900

(58) Field of Classification Search ................. 209/584, 209/900; 700/226

See application file for complete search history.

(56) References Cited

U.S. PATENT DOCUMENTS 3,420,368 A 1/1969 Sorrells (Continued)

FOREIGN PATENT DOCUMENTS

JP 1159088 6/1989

(Continued)

OTHER PUBLICATIONS

PCT Search Report and Written Opinion for related application PCT/US05/25846.

(Continued)

*Primary Examiner*—Stefanos Karmis
*Assistant Examiner*—Brett C Martin
(74) *Attorney, Agent, or Firm*—Leland Schultz, Esq.; Roberts Mlotkowski Safran & Cole, P.C.

(57) ABSTRACT

A system and method are disclosed for sorting mail pieces that may include both standard and higher class mail. The mail pieces are for delivery to various addresses, and the present invention postpones delivery to some addresses if those addresses are receiving insufficient mail. According to this method, data is collected about each mail piece, and that data for each mail piece is associated with a respective holder that holds the mail piece. Mail is withheld from immediate delivery if the collected data associated with the holder indicates that the mail piece is standard class having a non-immediate delivery deadline, provided that the collected data associated with other holders indicates that there are no other pieces having the same address and having either a higher class or an immediate delivery date.

20 Claims, 18 Drawing Sheets

U.S. PATENT DOCUMENTS 3,452,509 A 7/1969 Hauer
3,587,856 A 6/1971 Lemelson
3,757,939 A 9/1973 Henig
3,884,370 A 5/1975 Bradshaw et al.
3,889,811 A 6/1975 Yoshimura
3,901,797 A 8/1975 Storace
3,904,516 A 9/1975 Chiba
3,915,293 A 10/1975 Melchiorre et al.
3,933,094 A 1/1976 Murphy
4,008,813 A 2/1977 Leersnijder
4,058,217 A 11/1977 Vaughan
4,106,636 A 8/1978 Ouimet
4,169,529 A 10/1979 Hunter
4,244,672 A 1/1981 Lund
4,254,859 A 3/1981 Basso
4,303,503 A 12/1981 de Mimerand et al.
4,507,739 A 3/1985 Haruki
4,627,540 A 12/1986 Takeda
4,688,678 A 8/1987 Zue
4,738,368 A 4/1988 Shaw
4,868,570 A 9/1989 Davis
4,874,281 A 10/1989 Bergerioux
4,891,088 A 1/1990 Svyatsky
4,895,242 A 1/1990 Michel
4,921,107 A 5/1990 Hofer
4,923,022 A 5/1990 Hsieh
4,963,251 A 10/1990 Bohm et al.
4,965,829 A 10/1990 Lemelson
5,009,321 A * 4/1991 Keough ..................... 209/3.1
5,031,223 A 7/1991 Rosenbaum
5,042,667 A 8/1991 Keough
5,119,954 A 6/1992 Svyatsky
5,186,336 A 2/1993 Pippin
5,291,002 A 3/1994 Agnew
5,470,427 A 11/1995 Mikel
5,480,032 A 1/1996 Pippin
5,558,201 A 9/1996 Oppliger et al.
5,718,321 A 2/1998 Brugger
5,901,855 A * 5/1999 Uno et al. ................... 209/584
5,957,296 A 9/1999 Altenburg
5,981,891 A 11/1999 Yamashita
5,994,567 A 11/1999 Kingsley
5,994,657 A 11/1999 Maier et al.
6,126,017 A 10/2000 Hours
6,135,292 A 10/2000 Pettner
6,227,378 B1 5/2001 Jones
6,276,509 B1 8/2001 Schuster
6,347,710 B1 2/2002 Ryan
6,365,862 B1 4/2002 Miller
6,403,906 B1 6/2002 De Leo
6,435,353 B2 8/2002 Ryan
6,443,311 B2 9/2002 Hendrickson
6,508,365 B1 1/2003 Cacace-Bailey
6,561,339 B1 5/2003 Olson
6,561,360 B1 5/2003 Kalm
6,677,548 B2 1/2004 Robu
6,679,491 B2 1/2004 Luebben et al.
6,814,210 B1 11/2004 Hendzel
6,822,182 B2 11/2004 Kechel
6,897,395 B2 5/2005 Shiibashi
6,946,612 B2 9/2005 Morikawa
6,953,906 B2 10/2005 Burns
6,994,220 B2 2/2006 Schererz
7,004,396 B1 2/2006 Quine
7,060,926 B2 6/2006 Edmonds
7,084,365 B2 8/2006 Whitnable
7,111,742 B1 9/2006 Zimmermann
7,112,031 B2 9/2006 Harres
7,138,596 B2 11/2006 Pippin
7,170,024 B2 1/2007 Burns
7,210,893 B1 5/2007 Overman
7,227,094 B2 6/2007 Oexle
7,235,756 B2 6/2007 De Leo
7,250,582 B2 7/2007 Hanson et al.
7,259,346 B2 8/2007 Svyatsky
7,304,260 B2 12/2007 Boller
7,346,591 B2 * 3/2008 Sansone ..................... 705/410
7,378,610 B2 5/2008 Umezawa
7,396,011 B2 7/2008 Svyatsky
7,397,010 B2 7/2008 Wilke
7,397,011 B2 7/2008 Berdelle-Hilge
7,739,202 B2 * 6/2010 Kadaba ...................... 705/338
2002/0053533 A1 5/2002 Brehm
2002/0113365 A1 8/2002 Britton et al.
2002/0139726 A1 10/2002 Roth et al.
2003/0006174 A1 1/2003 Harres
2003/0155282 A1 8/2003 Kechel
2004/0139036 A1 7/2004 Acton
2006/0070929 A1 4/2006 Fry
2006/0124512 A1 6/2006 Quine
2006/0180520 A1 8/2006 Ehrat
2006/0191822 A1 8/2006 Avant
2007/0090029 A1 4/2007 Avant
2007/0131593 A1 6/2007 Burns
2007/0272601 A1 11/2007 Cormack
2008/0011653 A1 1/2008 Stemmle
2008/0012211 A1 1/2008 Stemmle
2008/0027986 A1 1/2008 Stemmle
2008/0093273 A1 4/2008 Stemmle
2008/0093274 A1 4/2008 Stemmle
2008/0164185 A1 7/2008 Stemmle
2008/0230449 A1 * 9/2008 Stemmle ..................... 209/584

FOREIGN PATENT DOCUMENTS

JP 1271789 10/1989
WO 97/36523 10/1997
WO 02/055222 7/2002
WO 03/024629 3/2003

OTHER PUBLICATIONS

PCT Search Report and Written Opinion for related application PCT/US05/25899.

"Development of in-process skew and shift adjusting mechanism for paper handling," American Society of Mechanical Engineers http://www.directtextbook.com, 1998.

Industrial Embedded HPC Applications-Supercomputer; G. Deconinck; p. 26-27.

PCT Search Report and Written Opinion for related application PCT/US05/25634.

Office Action of Aug. 20, 2009 issue in the corresponding Chinese Application No. 200580030563.

* cited by examiner

| |
|---|
| FIG. 15A |
| FIG. 15B |
| FIG. 15C |

SYSTEM AND PROCESS FOR REDUCING NUMBER OF STOPS ON DELIVERY ROUTE BY IDENTIFICATION OF STANDARD CLASS MAIL

TECHNICAL FIELD

The invention disclosed herein relates generally to carrier sequence sorting and more particularly to one-pass carrier sequence sorting that delays delivery of some mail.

BACKGROUND ART

The 2003 Presidential Commission Report on the Future of the United States Postal Service (USPS) concluded that the Postal Service should continue to develop an effective merging system that is responsive to customer needs and culminates in one bundle of mixed letters and flats for each delivery point. The system should accomplish this merging at the step of carrier sequence sorting by merging all elements of the mail stream (letters, flats, periodicals, post cards etc) at the final sorting process.

At this time, some of the mail streams arrive at the postal branch offices pre-sorted, and some do not. Generally, even when the mail arrives at the branch already sorted by delivery sequence, postal carriers need to merge multiple streams of mail (often as many as 10) from different mail trays—and for this they generally use a manual sorting process. When mail does not arrive at the branch pre-sorted, the carriers spend even more time—several hours—sorting the mail into carrier delivery sequence manually. Often, the carrier on mechanized routes will complete the mail merging while sitting at each post box—merging mail from multiple mail trays on the spot before placing it in the mailbox. Thus, carriers spend substantial time merging and sorting the mail before they can start to deliver it, or while they are delivering it, which makes the mail delivery process (the last mile) quite inefficient. The instant invention corrects that inefficiency, and in particular eliminates the need for a carrier to deliver at particular addresses where not enough important mail is being received to justify frequent deliveries.

In 1990, the USPS issued a Request for Proposal for a carrier sequence bar code sorter, type B, a single pass sorter to arrange mail in carrier delivery sequence. To date, 14 years later, no product has been manufactured and delivered to satisfy that need.

The USPS sometimes does delivery sequence sorting at central sorting facilities. The sorting is done there because the equipment required to automate this process is simply too large to fit in the branches. The cost would be prohibitive for the USPS to install such equipment in each branch. Furthermore, sorting centrally is also much more efficient, since the only sorters available today are multiple pass sorters which may include over a hundred bins and may require two or more sort sequences to get the mail in delivery sequence order. However, when the carrier delivery sequence sorting is done centrally, and then sent to branch offices, the carriers usually spend the first two hours of their day re-sorting the mail to correct errors. For many places in the postal network (especially outside the USA), mail is still sorted by the carriers manually, using the old (Ben Franklin) rack of cubbyholes to sort the mail into delivery sequence.

The sorters available today have significant limitations: they are either huge, expensive pieces of equipment with a very large number of bins, and require significant space to operate; or they have a smaller number of bins, but require multiple passes to operate. This multi-pass operation is a very labor-intensive process. So, for example, a sorter with 16 bins, sorting a job with 2000 mail pieces, will require three passes. That means the operator must load the mail, operate the sorter, then unload the mail from each bin and re-load it into the feeder three times! While this results in some time savings compared to manual sorting, the value proposition is limited because of the high labor content. See, for example, U.S. Patent Publication Serial No. 20020139726 entitled Single Feed One Pass Mixed Mail Sequencer, filed Apr. 2, 2001.

It is because of the high labor content still required with high speed, multi-pass sorting equipment that the USPS has requested proposals for a single pass system. Unfortunately, such a system would not necessarily do anything to eliminate unnecessary mail deliveries.

DISCLOSURE OF THE INVENTION

It is an object of the instant invention to provide a single pass delivery sequence sorting system for mail pieces and the like, so as to eliminate uneconomical and unwise mail deliveries that presently occur regardless of how much mail is being delivered to a particular address.

It is an additional object of the instant invention to provide for sorting incoming mail in enterprises. The manual method is still the most common method that enterprises use to sort their incoming mail. This is also very labor intensive, but the investment required and the size of available mail sortation equipment is generally prohibitive.

A further object is to provide a single pass delivery sequence sorting system which may be fabricated readily and relatively economically and which will enjoy a long life in operation.

It has now been found that the foregoing and related objects can be obtained in the instant invention to make dramatic improvements in the last mile efficiency for postal carriers and eliminate a significant amount of labor for sorting incoming mail to enterprises. The instant invention can sort a full day's mail for each carrier route from a random sequence into delivery sequence in a single pass. The instant invention has the capacity to accept an entire stack of mail to be delivered that day in complete random order, process it automatically and stack it into mail trays in correct delivery order sequence with very little labor required. The instant invention features a very short, straight, paper path (about 4 feet long) for optimum paper handling. The instant invention can process a wide latitude of mail piece types and merge flats, letters, periodicals in one pass. Additionally, a manual insertion feature is included to integrate and merge mail pieces (such as newspapers or odd sized pieces) that cannot be fed automatically, but which can be sorted, unloaded and stacked into mail trays automatically. Because this system completes the entire job in a single pass, the amount of labor to complete the sorting is dramatically reduced by eliminating the need to sweep (unload) sorter bins and re-load the feeder multiple times. There is no longer a need for the carrier to merge three or more streams of mail at each delivery point, which results in additional delivery efficiency. The time to complete the sorting is significantly reduced when compared to competitive (multi-pass) sorters (even though the competitive sorters operate at dramatically higher speeds), and especially when compared to manual sorting. Accordingly, more of the carrier's time is spent delivering the mail, not sorting it.

Additionally, the instant invention provides a one-pass carrier sequence sorter system having a significantly smaller footprint compared to competitive sorter systems. This increases the likelihood that enterprises (as well as posts) will consider utilize this product, since they are less likely to have to knock down walls in order to install it.

The instant invention further includes a video encoding station so that the operator can manually enter addresses that are not machine-readable. Unlike other sorter systems, a single operator can accomplishes manual address entry in parallel with the auto feed/read with no labeling or printing station being required.

The instant invention is a delivery sequence sorter that merges multiple streams of mail (flats, letters, periodicals) into a single stream, and sorts them into delivery sequence in a single pass. All types of mail are loaded simultaneously—in random order, singulated and transported a very short distance past an address reader to be loaded into numbered bins or holding stations with one mail piece per station. Each mail piece is transported the same short distance from the feeder to the holding station. Enough holding stations are provided to store all of the mail pieces in the sorting job. The holding stations are connected together and moved slowly in an endless loop, such as a racetrack-shaped sorting path. The system controller associates the address information read from each mail piece with the number of the holding station for each piece. The controller creates an algorithm for unloading the individual pieces from the holding stations in the delivery sequence—into a plurality of interim unloading stations. The controller temporarily associates each of the several interim unloading stations with one of the addresses on the carrier route. (The number of interim unloading stations can be substantially fewer than the total number of addresses to be sorted.) The endless loop of holding stations moves past the interim unloading stations with selected mail pieces ejected from the holding stations into the interim unloading stations. All mail pieces destined for a common address are unloaded into the designated interim unloading station associated with that address during a single revolution of the racetrack sorting device. After the first revolution of the racetrack sorting device, the interim unloading stations then move to a final bundling/wrapping station and unload the mail in the correct order—directly into a mail tray. The interim unloading stations then return to their home position and a new address is associated with each of them. The mail for this batch of addresses is ejected from the racetrack sorting device into the interim unloading stations during the second rotation of the racetrack sorting device and these in turn are moved to the final bundling/wrapping station. This sequence continues until all the mail pieces are unloaded into mail trays.

The instant invention includes a process for sorting a batch of mail in random order into delivery sequence order in a single pass, including the steps of feeding, reading and storing all the mail pieces with one piece each stored in numbered holding stations, moving the holding stations in a single endless loop, ejecting the mail pieces from the holding stations in the correct sequence into a number of interim unloading stations, the number of which may be substantially fewer than the number of total addresses on the mail pieces, then unloading the sorted mail pieces from the interim unloading station into mail trays.

The instant invention includes sequencing algorithms which load mail pieces in their original random order into the numbered holding stations, associate scanned address information for each mail piece with the numbered holding station containing it, then assign a temporary carrier route address identifier to each of a plurality of interim unloading stations, and eject mail pieces from the holding stations to the interim unloading stations in a sequence associated with the temporary address assigned to each interim unloading station. The cycle is repeated numerous times with new temporary address information assigned to each of the interim unloading stations for each cycle.

In the instant invention the number of interim unloading stations are significantly fewer than the number of addresses on the carrier route for a system that automatically processes all of the mail for the route in a single pass.

The instant invention includes a method of reducing the total job time by manual feeding of mail pieces which cannot be fed automatically, and manual inputting of addresses which cannot be read successfully by the automated address reader, and providing the same automated processing after these manual steps as for the mail pieces which could be machine read or machine fed. The partial manual intervention required to process these types of mail pieces is conducted in parallel with the initial feeding cycle—so that no incremental time is required for accomplishing these manual tasks.

The system and method disclosed herein improve mail sortation of mail pieces that include both standard and higher class mail. If those mail pieces are for delivery to various addresses, the present invention postpones delivery to some addresses if those addresses receive insufficient mail to justify a delivery. According to this method, data is collected about each mail piece, and that data for each mail piece is associated with a respective holder that holds the mail piece during the sortation process. Mail is withheld from immediate delivery if the collected data associated with the holder indicates that the mail piece is standard class having a non-immediate delivery deadline, provided that the collected data associated with other holders indicates that there are no other pieces or parcels having the same address and having either a higher class or an immediate delivery date.

The invention will be fully understood when reference is made to the following detailed description taken in conjunction with the accompanying drawings.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

MODES FOR CARRYING OUT THE INVENTION

Figure 1:
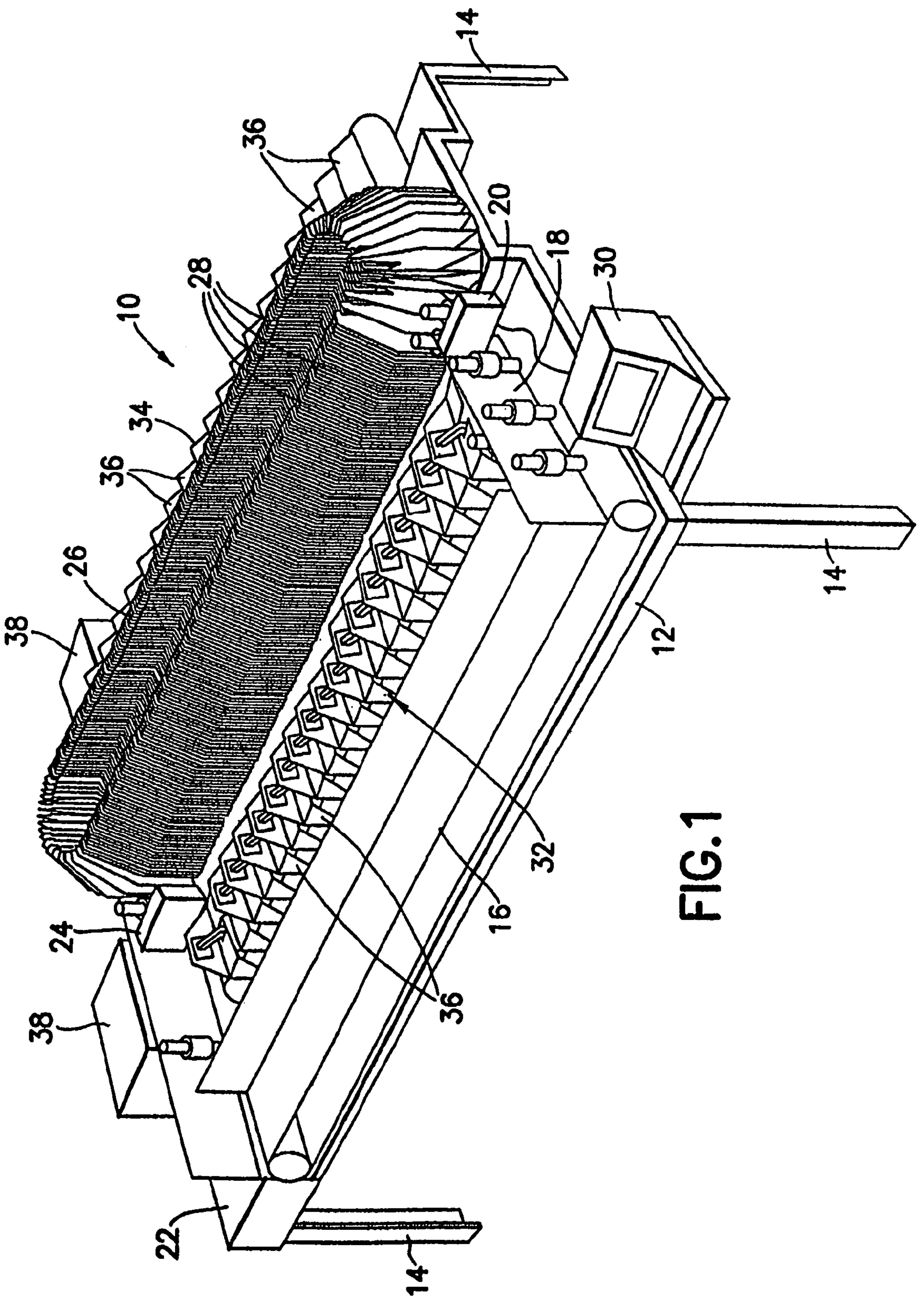
FIG. 1 is a perspective view of a single pass carrier delivery sequence sorter in accordance with the instant invention.

Turning first to FIG. 1 of the drawings, therein illustrated is a single pass carrier delivery sequence sorter generally indicated by the numeral 10 and made in accordance with the instant invention. The single pass carrier delivery sequence sorter 10 has a base 12 with four legs 14 (only three shown in FIG. 1) extending therefrom. An auto feed station 16 extends lengthwise along the base 12 and has a feeder 18 and an address reader 20 at one end and a manual feed station 22 with a second address reader 24 at the other end. The feeder 18 and address reader 20 create a feed, read and insert path to a racetrack sorting device 26 which has an array of bin dividers 28, adjacent ones of which create holders for individual mail pieces deposited therebetween. A video encoder/numerical controller 30 which may be a microprocessor or the like is located adjacent the feeder 18 and operationally connected to various components of the single pass carrier delivery sequence sorter 10 for coordinating the operation of the same in a manner to be explained further hereinafter.

On either side of the racetrack sorting device 26 are two interim unloading station units generally indicated by the numeral 32, each having twenty (20) interim unloading stations 36. At the ends of the interim unloading station units 32, bundling/wrapping stations 38 are mounted on the base 12.

Figure 8:
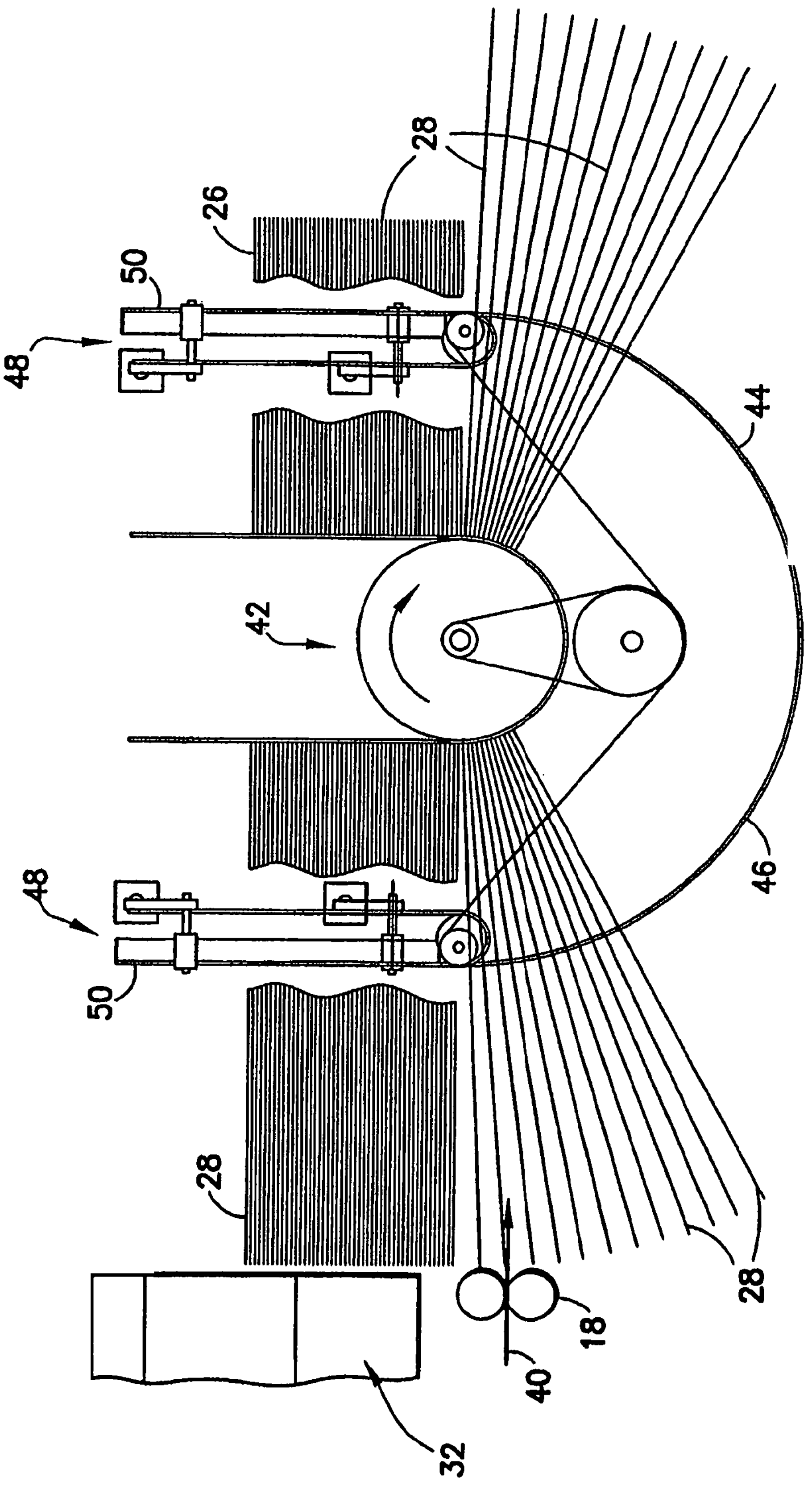
FIG. 8 is a schematic top view of the mail loading insert area of the single pass carrier delivery sequence sorter of FIG. 1 with some bin dividers removed for purposes of illustration.
Figure 9:
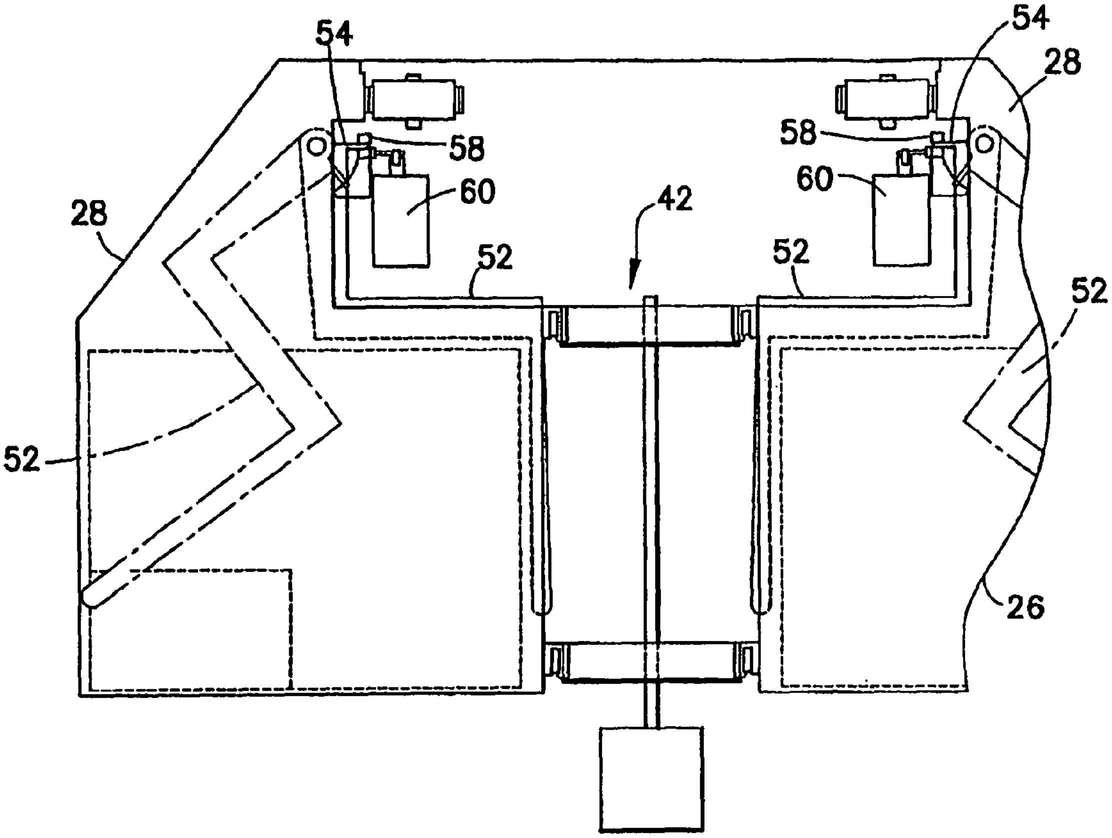
FIG. 9 is a schematic side view of deflector gates and eject arms associated with the bin dividers of the single pass carrier delivery sequence sorter of FIG. 1 with the ejector arms in their unactuated positions in combined solid and dotted line and their actuated positions in phantom line.
Figure 10:
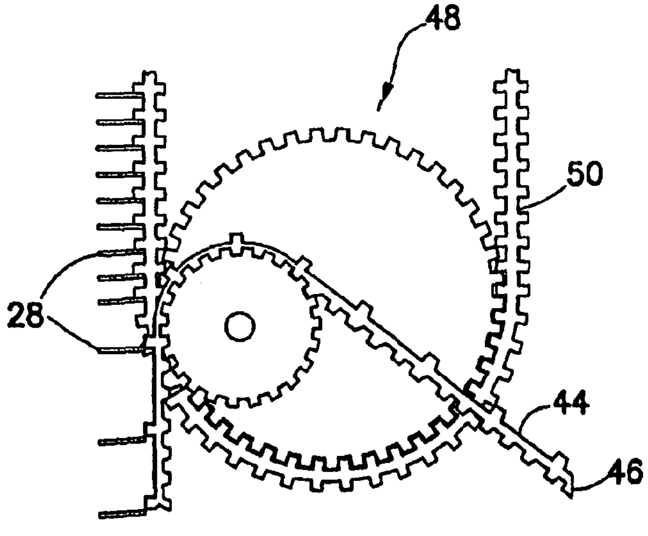
FIG. 10 is a schematic top view of timing belts for the drive of the single pass carrier delivery sequence sorter of FIG. 1.

Referring now to FIGS. 6A, 6B and 7 through 10, therein illustrated are the details of the racetrack sorting device 26. In FIG. 8, incoming mail pieces from the feeder 18 move along a mail insert path 40 into the array of bin dividers 28 with one mail piece being inserted between adjacent bin dividers 28 as the bin dividers 28 separate as they pass around the semi-circular area at the end of the racetrack sorting device 26. The bin dividers 28 in the racetrack sorting device 26 are driven along in a clockwise direction by a bin belt drive system generally indicated by the numeral 42 at inches/second. The bin belt drive system 42 is connected to the inner edges of the bin dividers 28 to move them in desired clockwise direction. To help drive the upper edges of the bin dividers 28, a round-the-turn belt drive 44 has a double sided timing belt 46 with two of every three teeth on one side of the timing belt removed to create a 12 millimeter pitch on the outer side. The round-the-turn belt drive 44 is operationally connected to two top-of-the-bin belt drives generally indicated by the numeral 48. As best seen in FIGS. 8 and 10, the top-of-the-bin belt drives 48 extend parallel to each other and each includes double sided four millimeter pitch timing belts 50 which engage upper extensions of the bin dividers 28 after they are moved into position by the timing belt 46. This arrangement of the top-of-the-bin belt drives 48 moves the bin dividers 28 at a speed of about five inches/second after being moved by the round-the-turn belt drive 44 at a speed of about fifteen inches/second.

Figure 6B:
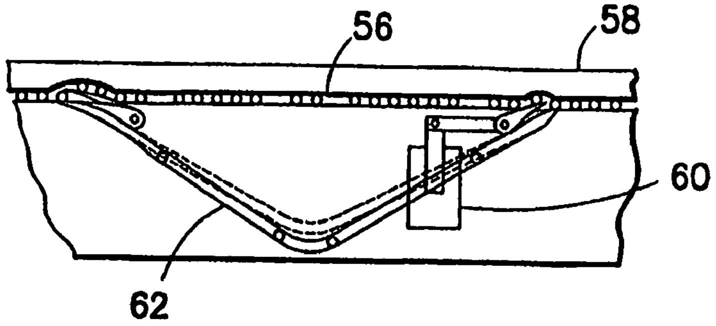
FIG. 6B is a schematic top view of the ejector mechanism in the bin dividers of the single pass carrier delivery sequence sorter of FIG. 1.
Figure 6A:
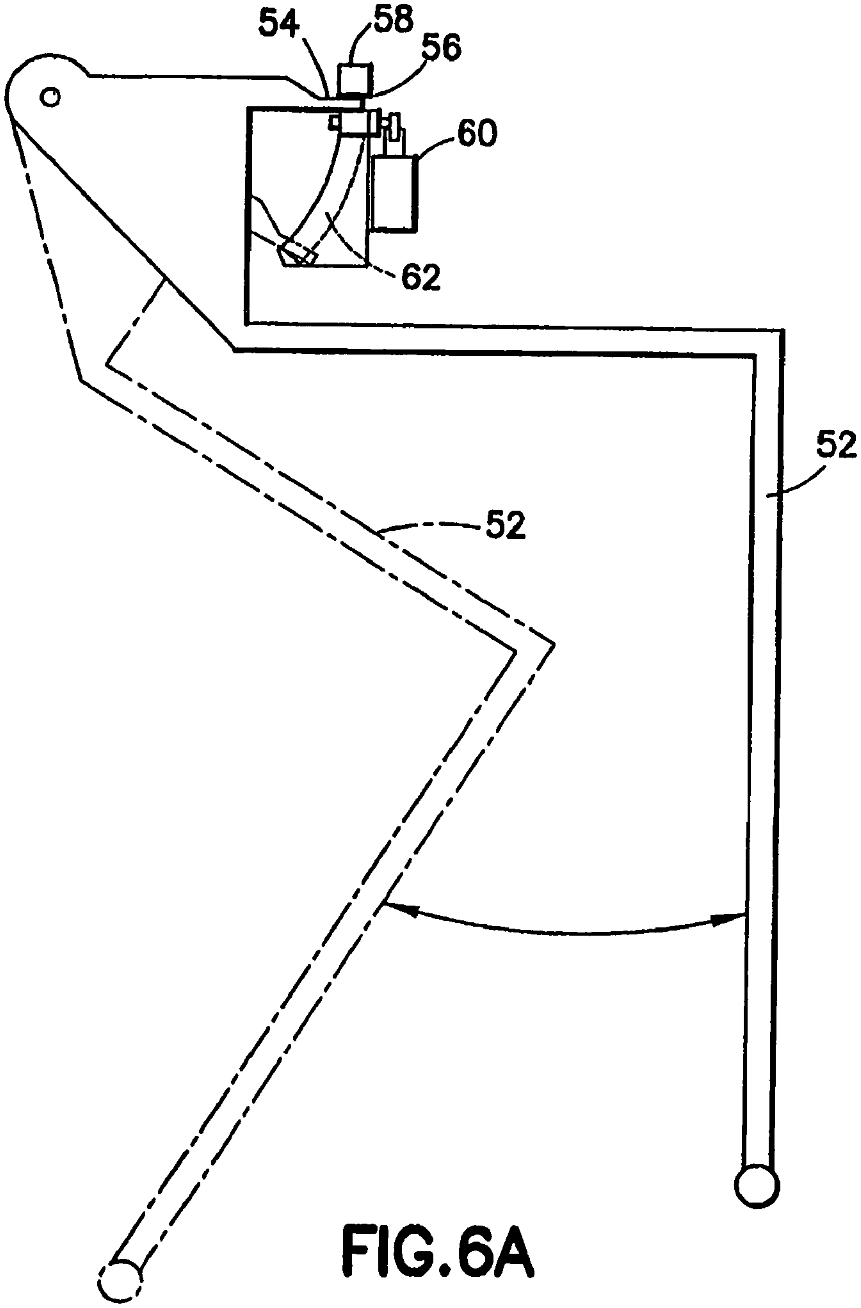
FIG. 6A is a schematic side view of an ejector mechanism in the bin dividers of the single pass carrier delivery sequence sorter of FIG. 1 in its unactuated position in solid line and its actuated position in phantom line.
Figure 7:
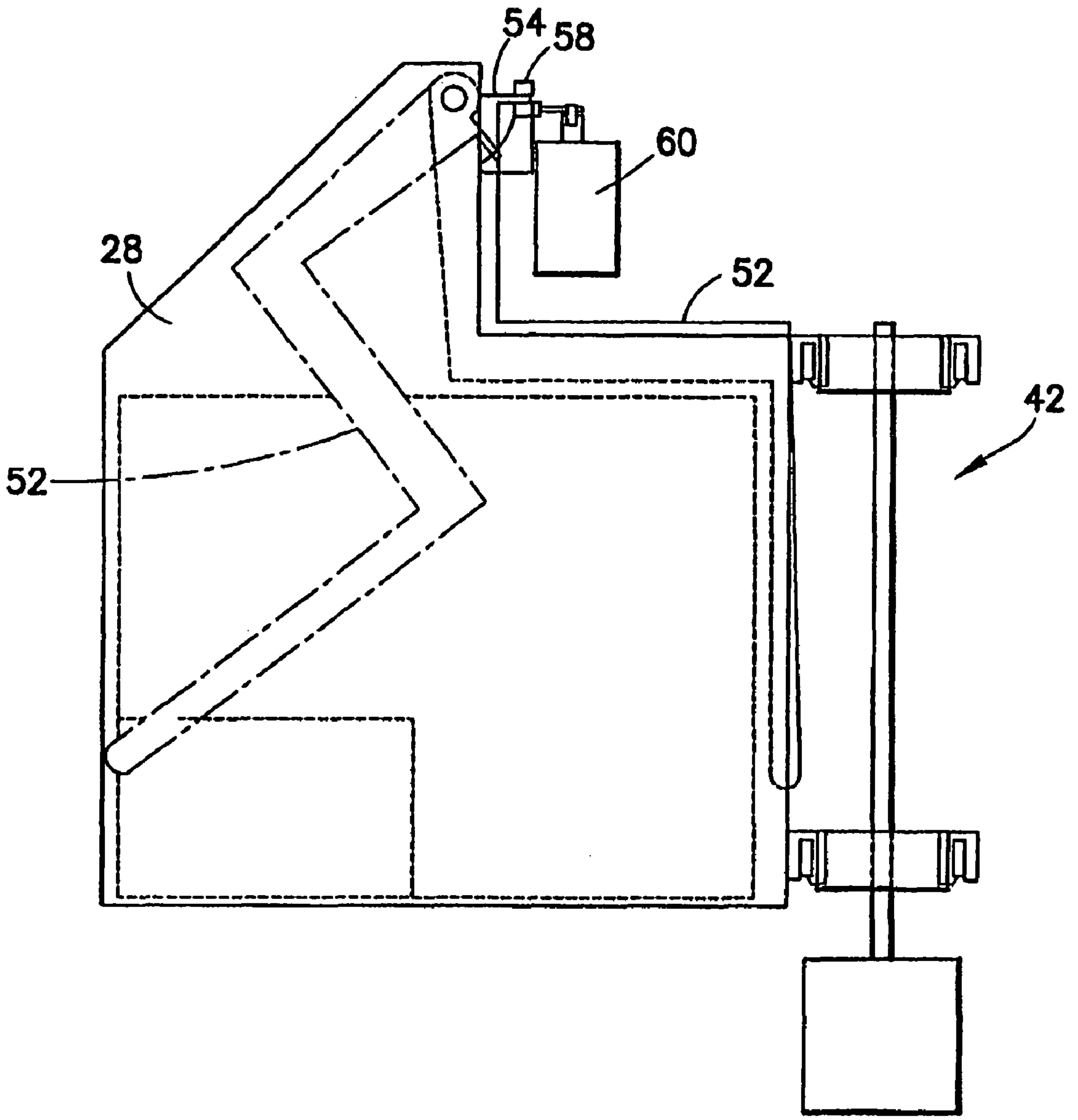
FIG. 7 is a schematic side view of the drive and linkage for the bin dividers of the single pass carrier delivery sequence sorter of FIG. 1 with the ejector arm in its unactuated position in combined solid and dotted line and its actuated position in phantom line.

To remove mail pieces from the racetrack sorting device 26 to the interim unloading stations 36, each bin divider 28 has an ejector arm 52 as shown in FIG. 6A. The ejector arm 52 is pivotally mounted and dimensionally sized to have a relatively flat sweep to engage the mail piece (sized from 3"×5" to 12"×15") and push it from between the adjacent bin dividers 28. The ejector arm 52 can be plastic molded or a wireform design. Each ejector arm 52 has a cam follower 54 which normally runs in a slot 56 in a fixed rail 58 associated with the entire path of the endless array of the bin dividers 28. The ejector arm 52 rides in the slot 56 of the fixed rail 58 to hold the ejector arm 52 in an unactuated position. To operate the ejector arm 52 from the solid line position to its phantom line position in FIGS. 6A, 7 and 9 when the bin divider 28 reaches an interim unloading area at which point it is desired to move the mail piece from the bin divider 28 into one of the interim unloading stations 36, a deflector gate and solenoid actuation mechanism 60 can divert the cam follower 54 of the ejector arm 52 into an ejector cam path 62 as shown in FIG. 6B with an ejector stroke of 1.9" and ejector return of about 2". With its cam follower 54 within the ejector cam path 62, the ejector arm 52 is caused to rotate and engage the mail piece to push it out from between the adjacent bin dividers 28 and into the desired interim unloading station 36. At the end of the ejector cam path 62, the cam follower 54 returns to the slot 56 which continues to hold the ejector arm 52 in the unactuated position. The deflector gate and solenoid actuation mechanism 60 can divert any number of cam followers 54 from the slot 56 to the ejector cam path 62 so, if mail pieces in several adjacent bin dividers are all addressed to the same address, the deflector gate and solenoid actuation mechanism 60 simply stays engaged and diverts the cam followers 54 on multiple bin dividers 28 from the slot 56 to the ejector cam path 62.

Figure 11:
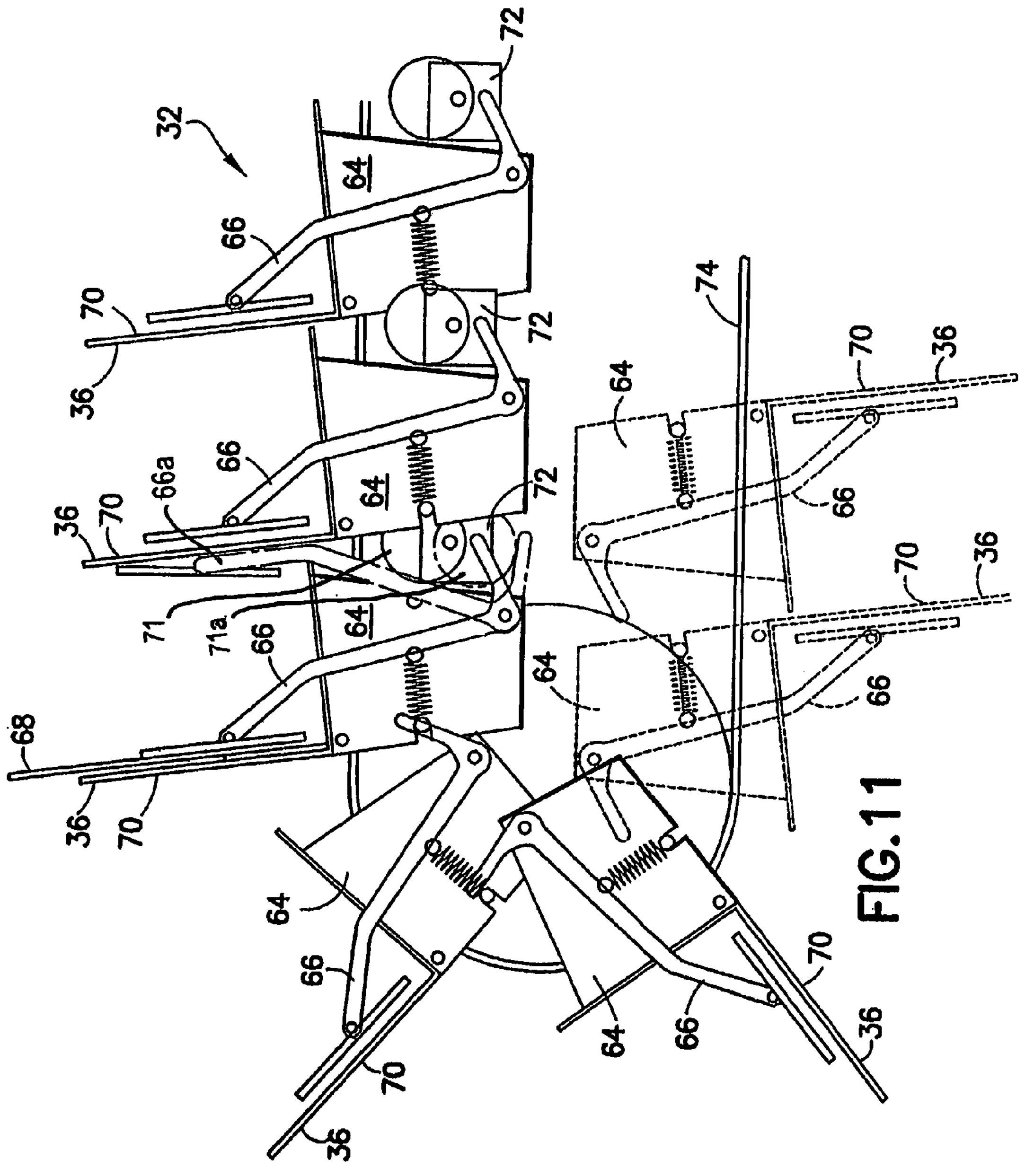
FIG. 11 is a schematic side view of interim unloading stations of the single pass carrier delivery sequence sorter of FIG. 1.

As best seen in FIG. 11, the interim unloading station units 32 have a plurality of unloading tray assemblies 64 which correspond to the interim unloading stations 36. Each unloading tray assembly 64 includes a pivotal arm 66 to support the ejected mail pieces 68 against a fixed wall 70 and a fixed position motor and cam actuator system 72 for moving cam 71 to a position 71*a*, and thereby moving the pivotal arm 66 to a position 66*a* which is away from the ejected mail pieces 68 in order to accept a new mail piece. The pivotal arm 66 on each interim tray assembly 64 is actuated in synchronization with the actuation of the ejector arms 52 on the bin dividers 28 so the pivotal arm 66 opens to accept an ejected mail piece from the bin dividers 28.

Figure 2:
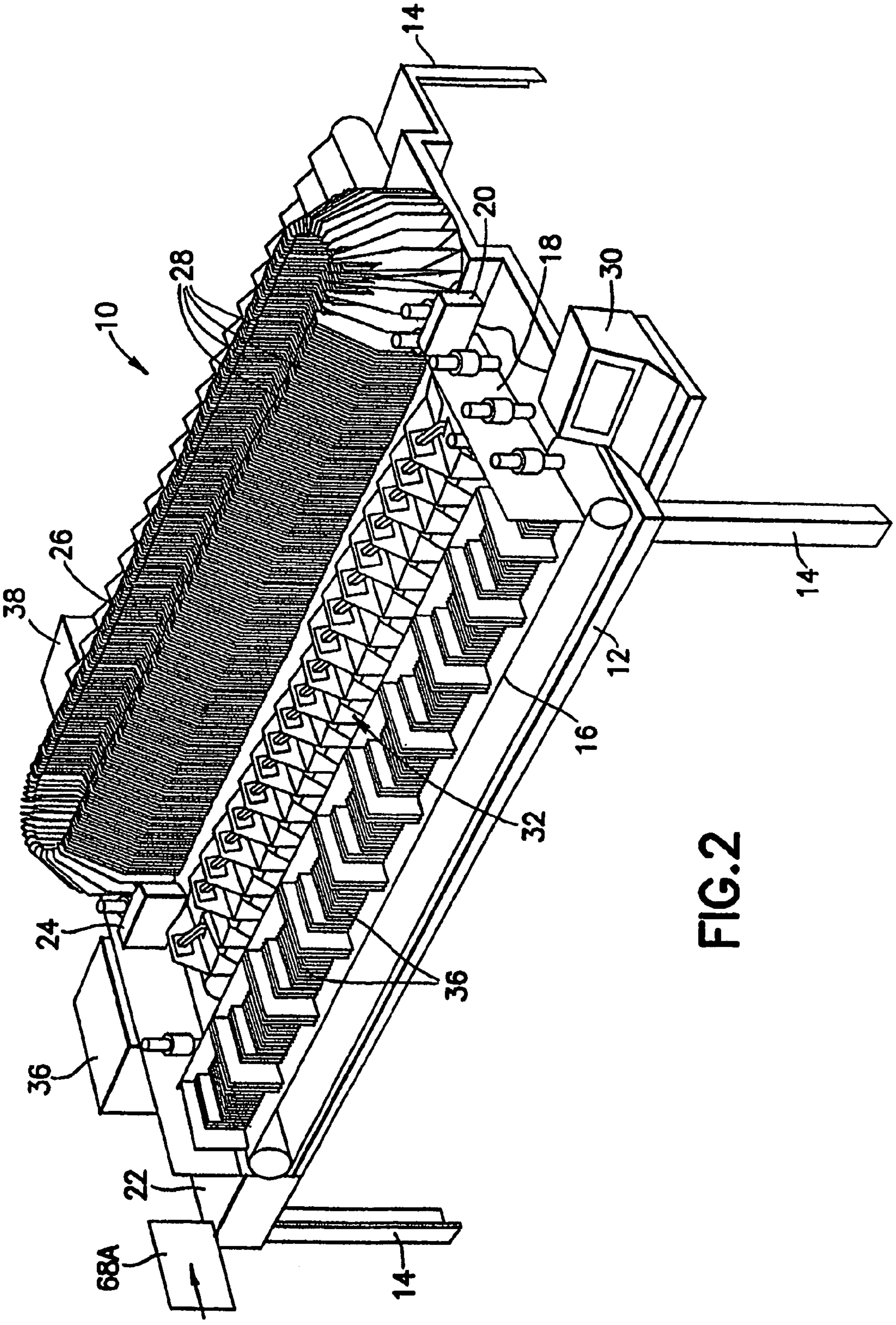
FIG. 2 is a perspective view of the single pass carrier delivery sequence sorter of FIG. 1 illustrating the steps of loading, feeding, reading and inserting mail pieces.

The operation of the instant invention will now be explained in greater detail. As seen in FIG. 2, the operator initially loads up to 2000 mail pieces into the auto feed station

16 and initiates the feed cycle. The mail pieces are singulated by the feeder 18, moved past the address reader 20 and inserted between the holders formed by adjacent bin dividers 28 along mail insert path 40 (FIG. 8). This operation proceeds at 8000 feed/inserts per hour. During the feed cycle, the thickness of each mail piece is measured and remembered by the controller 30 along with the bin location of that mail piece. After each mail piece is inserted between the bin dividers 28, the racetrack sorting device 26 indexes to the next empty space for the next mail piece to be inserted.

For any address that cannot be read and interpreted by the address reader 20, the controller 30 records the bin location of the mail piece and its address image is stored for interpretation by the operator at the controller 30. The operator reviews the unreadable addresses on the controller 30 and enters the correct address interpretation. The controller 30 associates this information with the bin location of the mail piece.

At the manual feed station 22 in FIG. 2, the operator manually inserts mail pieces 68A that cannot be fed automatically. These are scanned for addresses and inserted into empty holders formed by adjacent bin dividers 28.

Figure 3:
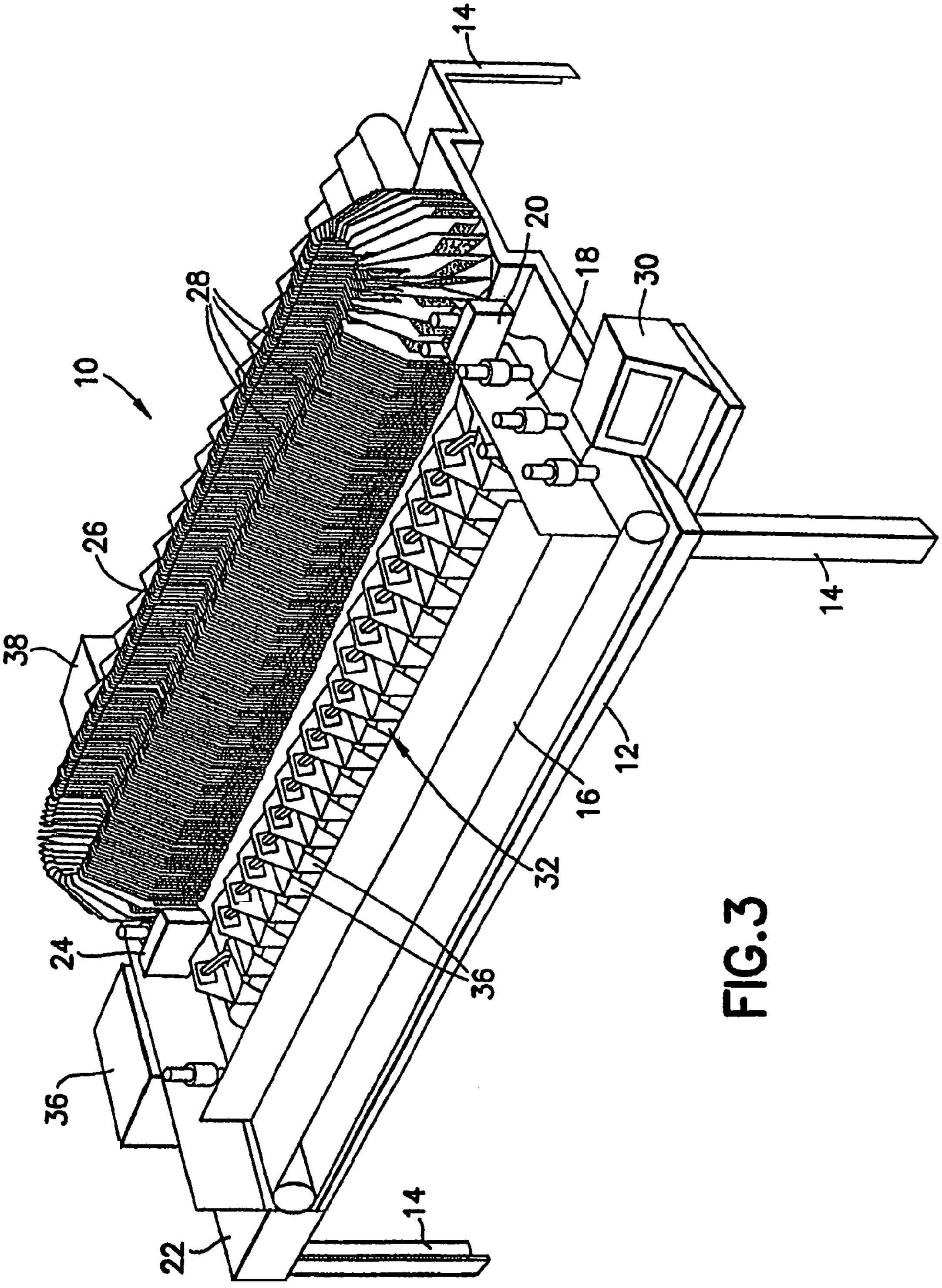
FIG. 3 is a perspective view of the single pass carrier delivery sequence sorter of FIG. 1 illustrating the step of calculating an unload sequence.

After all of the mail pieces have been fed, read and inserted between the bin dividers 28 in their original order as seen in FIG. 3 and the operator has inputted the correct addresses for those pieces that were not machine readable, the controller 30 calculates the correct sequence for unloading the mail pieces in the correct delivery order. The controller 30 assigns each of the forty interim unloading stations 36 to receive all the mail for the first forty specific addresses. However, the controller 30 calculates the total number of mail pieces and the accumulated thickness of all of those mail pieces for each address. If the accumulated thickness exceeds the capacity of one unloading tray assembly 64, two or more unloading tray assemblies 64 are assigned to hold the total mail pieces for that address.

When the correct unload order has been determined by the controller 30, the racetrack sorting device 26 begins to rotate past the interim unload station units 32 at five inches/second. As the racetrack sorting device 26 rotates past the interim unloading station units 32, whenever a mail piece passes an interim unloading station 36 with the designated address of the mail piece, the mail piece is ejected into the unloading tray assembly 64 of the interim unloading station 36. See FIGS. 4, 6A, 6B, 7 and 9. As the mail pieces pass the interim unloading station units 32, it should be noted that the mail pieces are sandwiched between the bin dividers 28 so that they are aligned in a vertical face-to-face relationship and not end-to-end as found in many prior art mailing systems, whereby the sorting is accomplished in a relatively prompt manner without having to rotate the racetrack sorting device 26 at high speed. When a mail piece is being ejected from the racetrack sorting device 26, the actuator system 72 (FIG. 11) of the designated unloading tray assembly 64 cycles to move the pivotable arm 66 to the right to position 66*a*. When the mail piece is in the unloading tray assembly 64, the actuator system 72 returns to home position and the pivotable arm 66 pushes against any mail pieces in the unloading tray assembly 64 to hold them in an upright position on fixed wall 70.

At the end of one revolution of the racetrack sorting device 26, all of the mail pieces for the first forty addresses have been unloaded from the racetrack sorting device 26 to the interim unloading stations 36. The mail pieces for the remaining (400–40=360) addresses remain in the racetrack sorting device 26. So each interim unloading station 36 now contains a batch of the mail pieces for one specific address (unless more than one unloading tray assembly 64 was designated for that address for the reasons previously indicated).

Figure 5:
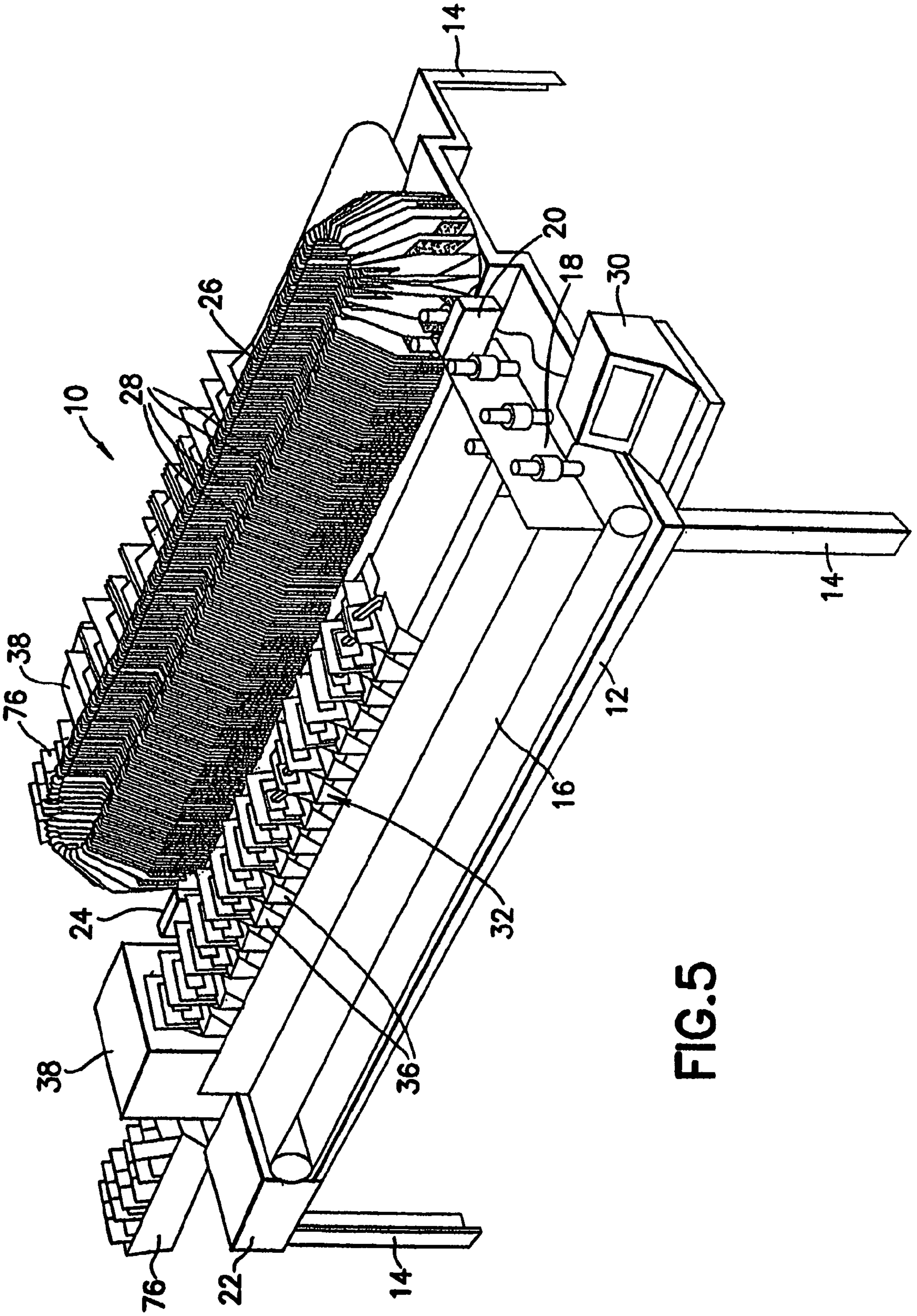
FIG. 5 is a perspective view of the single pass carrier delivery sequence sorter of FIG. 1 illustrating the step of bundling and stacking mail pieces for the first forty addresses of the carrier route performed by the single pass carrier delivery sequence sorter of FIG. 1.

As seen in FIGS. 5 and 11, after all of the mail destined for the first forty addresses are ejected from the racetrack sorting device 26 into the unloading tray assemblies 64 of the interim unloading stations 36, the belt 74 under the unloading tray assemblies 64 advances the unloading tray assemblies 64 to the bundling/wrapping station 38 at the end of the belt 74. There, each batch of mail pieces with a common address is unloaded from its unloading tray assembly 64 to the bundling/wrapping station 38 to be wrapped and stacked in mail trays 76. The cam follower portion of the pivotable arm 66 can translate below the cam in this interim unloading sequence.

The bundling/wrapping stations 38 are designed so that the wrapping operation can be done at 3 seconds/bundle. When all the unloading tray assemblies 64 are emptied, the belt 76 reverses and drives the unloading tray assemblies 64 back to their home position, ready for the next forty addresses to be unloaded into them.

Figure 4:
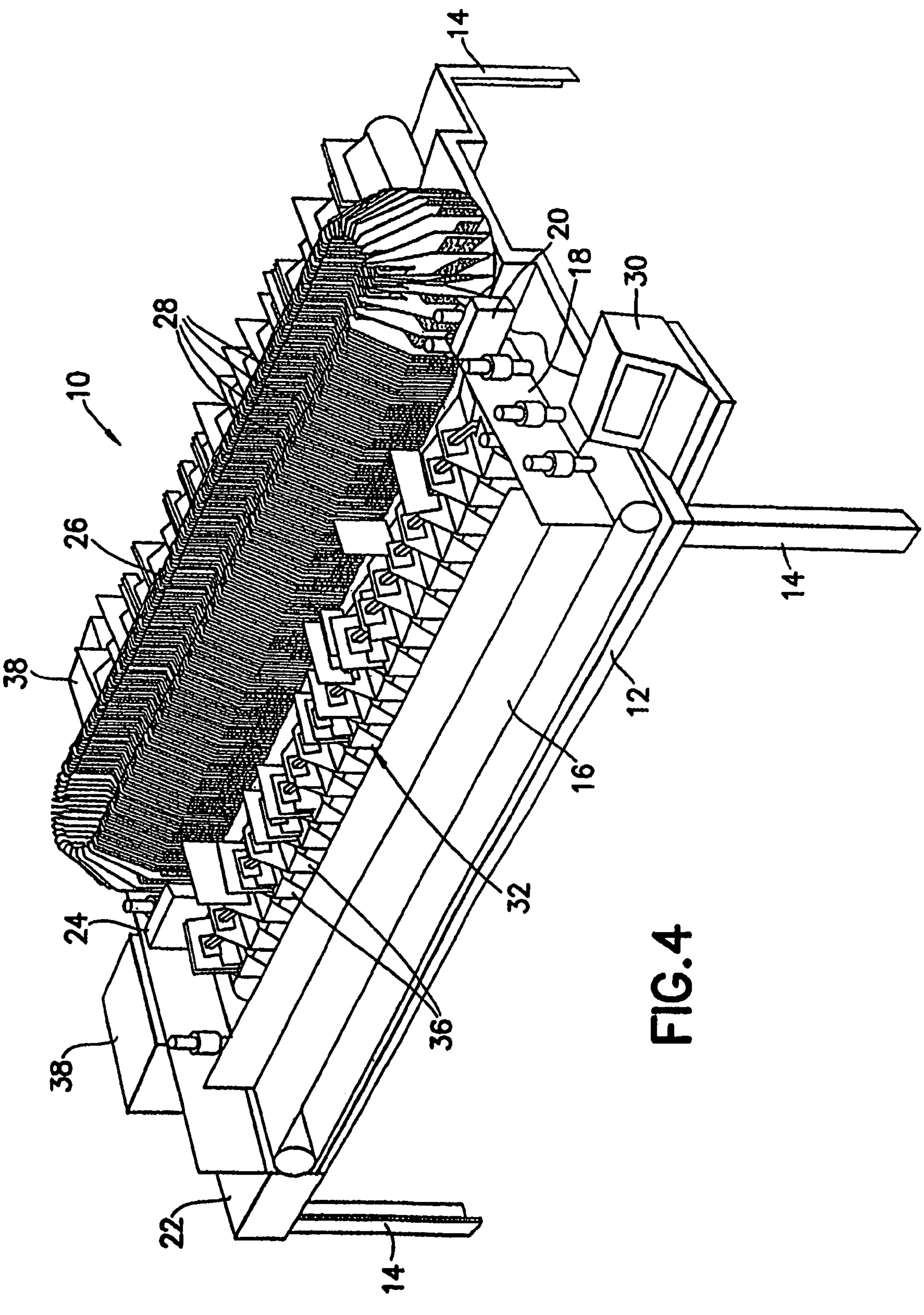
FIG. 4 is a perspective view of the single pass carrier delivery sequence sorter of FIG. 1 illustrating the step of unloading mail pieces for the first forty addresses of the carrier route.

Once the first set of forty addresses have been wrapped and stacked, and the unloading tray assemblies 64 have returned to their home position, the controller 30 temporarily assigns the next forty addresses to the interim unloading stations 36. The racetrack sorting device 26 rotates an additional revolution (at 5 inches/second) and the next batches of mail pieces for the next forty addresses are ejected into the interim unloading stations 36 as shown in FIG. 4. Then, those batches of mail pieces are advanced to the bundling/wrapping station 38 as shown in FIGS. 5 and 11. This sequence is repeated until the racetrack sorting device 26 is emptied of all mail pieces to complete the sorting job.

Typically, for 2000 mail pieces, with an average of 5 pieces going to each address, and 400 addresses per route, the racetrack sorting device 26 needs to rotate a total of 10 times per job, and the wrapping/stacking sequence is also repeated 10 times per job.

Figure 12:
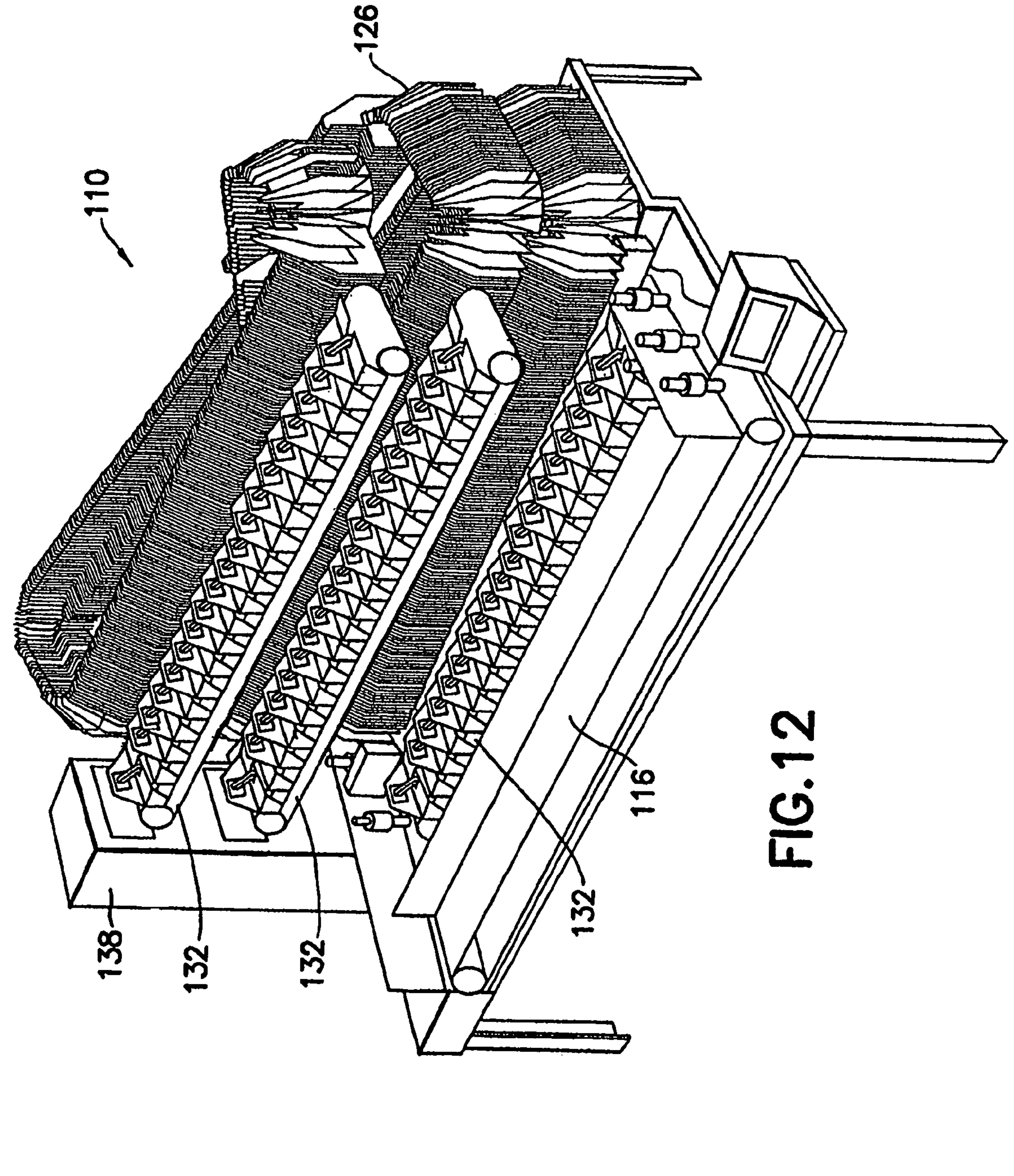
FIG. 12 is a perspective view of a three tier single pass carrier delivery sequence sorter in accordance with the instant invention.

In FIG. 12, therein is illustrated a modified form of the instant invention which provides a three tier single pass carrier delivery sequence sorter 110 which has a single auto feed station 116 and three interim unloading station units 132 adjacent a three tier racetrack sorting device 126. At the end of the three interim unloading station units 132 is a three tier bundling/wrapping station 138.

Another modified form of the instant invention provides a three tier single pass carrier delivery sequence sorter which has three auto feed stations and four interim unloading station units surrounding a three tier racetrack sorting device. At the end of each pair of interim unloading station units is a two tier bundling/wrapping station.

As will be appreciated by those skilled in the art, the instant invention can be programmed to operate in various sequences according to algorithms as described hereinafter:

I. Carrier Delivery Sequence Sorter—Bundle by Addresses

The instant invention merges and collects all mail from all mail streams into a single location—previously identified as an "interim unloading station", then moves this interim unloading station to a final stacking subsystem, an alternate embodiment includes a further sub-system is provided for wrapping, strapping, or otherwise enclosing all of the mail destined for each address into a single enclosure before stacking it in the mail tray. In this way, whether the delivery route is mechanized or on foot, the carrier needs only to pick up the next packet in the tray and deposit it in the next post box on the route.

Additional features can be added to this bundling/wrapping subsystem to promote further efficiency in the mail delivery process. For example, an ink jet printer could print a unique bar code on each wrapped packet—and the system software links this code with all of the bar codes, planet codes, POSTNET barcodes, and any other scanned and stored information on the surface of the mail piece. When the carrier delivers the entire packet, he/she scans only the external barcode at each address—and the software links this in the system memory with all the pieces in the packet. So, only one scan is required per delivery point, regardless of the number of coded mail pieces are bundled in the packet. If a signature is required on any piece in the packet, the printer prints an alert for the carrier on the wrapper. Alternately, the wrapping could be done in a different color.

In an alternate embodiment, RFID tags are affixed to the wrapper material either instead of or in addition to the printing subsystem. So, during the wrapping process, the RFID tag could be provided with a unique identifier for each packet, which would be associated and linked with all the information (codes, etc) previously scanned on each or the enclosed mail pieces. This technology will make the carrier even more efficient at the point of each delivery. Instead of a separate action to scan a bar code on the wrapper, the carrier carries an RFID interrogator unit to read the information on each RFID tag as the bundle is being delivered, and provide feedback information to the central database that all the contents of the bundle were delivered at the noted time. Additionally, the RFID interrogator unit could be adapted to include an audio capability so that when the information is extracted from the wrapper by RFID interrogation, and if one or more pieces of mail in the packet requires action on the part of the carrier (example, get the receivers signature), the carrier can be prompted or alerted audibly by the RFID unit to take the required action.

The single pass, carrier sequence sorting system merges multiple streams of mail into a single stream, sorts by delivery sequence, and gathers all the mail for an address into a packet, unloads the sorted mail directly into a mail tray. The invention disclosed herein involves adding a wrapping or enclosing capability to each packet of mail destined for each address on the carrier route. Additionally, a printing capability can be added to print bar code information and alert information, and possibly delivery address information on the outside of the enclosure or wrapper. The bar code printed on the wrapper is linked with previously scanned and retained information on all of the mail pieces inside the packet—bar codes, planet codes, and any other intelligent mail feature. When the carrier delivers the packet to each address, by scanning the single bar code on the outside of the packet, delivery information is simultaneously captured on all of the pieces in the packet.

One benefit of the instant invention is that a Post, such as the USPS, can reduce its annual operating costs over a sorting system that does not have the ability to bundle common addressed pieces into a single enclosure. Perhaps more importantly, while carriers do not scan each delivered mail piece today, they are likely to be required to do so in the near future in order to enable value added services associated with intelligent mail. This need to scan multiple mail pieces at each delivery point will make the carriers even less efficient. By linking the information on the contents of each packet with a single bar code printed on the external face of each packet, the carrier actions to scan only the face of the packet will restore the efficiency, plus facilitate adding value added services without adding incremental postal labor. By linking the scanned information with an RFID tag on the wrapper/enclosure, the carrier becomes even more efficient, while providing much more information to the system, the posts, and the customers relating to delivery times.

Additional benefits occur when the enclosing step above involves sealing the mail pieces in an enclosure such as a poly-wrap. Customers receiving a sealed packet containing all of their mail each day will be reassured in two ways. First, they will know if the packet remains sealed that no one has tampered with their mail after it was delivered by the postal carrier, e.g., no Social Security checks were stolen, etc. Secondly, if the USPS continues to invest in detection equipment to assure that no mail with biohazardous materials or other evil substances gets past the postal sorting facilities, then wrapping each persons mail in a sealed enclosure will tend to promote a sense of security on the part of the receivers.

II. Carrier Delivery Sequence Sorter—Algorithms

Previously, a single pass sorting system has been described that merges multiple streams of mail into a single job, sorts by delivery sequence, and unloads the sorted mail automatically directly into a mail tray—and wraps the mail and prints information useful to the carrier during the delivery process. Those two concepts achieve the recommendations from the Presidential Commission in 2003: “one individually wrapped bundle” of mail per address.

The following embodiments of the instant invention include a series of twelve special operational algorithms that can be used with the previously disclosed single pass delivery sequence sorter—each of which augments the inherent automated capabilities and overcomes inherent limitations for more efficient job time and operating sequences. The result of each of these special algorithms is either less labor content, wider latitude per job, shorter job time—or in short, lower cost per job.

Alternatives exist for creating the objective of one individually wrapped bundle of mail per address—albeit each having undesirable and inefficient characteristics. For example, multipass-sorting options can be used to sort mail into delivery sequence for systems having relatively small footprints. For very large sorters having a number of bins matching the number of addresses, a single pass delivery sequence sort is possible—but only with a very expensive and very large machine. Most of these systems do not handle the entire range of mail to be delivered—so the result is multiple streams of mail ordered by delivery sequence, but these multiple streams must then be merged into a single sequence—and often this step needs to be done manually.

Additional problems exist with current methods of sorting by delivery sequence. Inevitably, some of the mail pieces cannot be fed and processed automatically because they are too thick, too large, too slick, too thin and flimsy,—etc. These pieces—if the operator attempts to feed them into the system—are more prone to jamming the system than normal pieces. This results in significant down time to clear the jams. Experienced operators, knowing which types of pieces are more likely to cause trouble if introduced into the automated processing equipment, will cull out the “non-machineable” pieces. These will then be processed manually—which adds time and inefficiency to the mail processing.

Similarly, there are certain types of addresses that cannot be read and interpreted accurately by the automated address reading system. Often, the image of these addresses is captured and sent to a remote location where an operator interacts with the image on a video screen to read the address and keystroke in a code to identify the intended delivery point. Some current sorting systems include a means to print a special code on the back of the envelope, which is used as a substitute for the address information originally printed on the envelope. When the remote operator keys in the correct address, this information is associated with the code printed on the envelope in all subsequent mail sorting operations. In the time interval after the initial (unsuccessful) scan of the mail piece and the remote video operator keying in the correct address information—one of two things happens to the mail piece. It is either sent into a loop which will keep the mail piece moving within transports in the sorting system until the correct information is keyed in—or it is diverted into a stack temporarily. In the first option, the cost of the mail handling system must include the cost of the loop which keeps the mail piece in the system. Also, by continuing to move the mail piece around while waiting for the correct information to be keyed in remotely, there is increased risk of jamming the mail piece. In the second option, additional steps are required by the sorter operator to re-load and re-feed the pieces that were originally non-readable. This requires additional labor, which makes the processing job less efficient. And, with both systems, since the sorter operation is a labor intensive—full time job, the remote video encoding requires an additional worker—whose labor must be added to the cost of the sorter operator's labor when calculating the cost to complete the sorting job.

Some of the mail pieces prepared for mass mailings cannot be handled successfully by most of the known automated equipment. For example, the USPS accepts mail in odd shapes (such as the shape of a banana, a heart, an Easter bunny, etc—but only if the mailer sorts and drop ships these mail pieces directly to the final branch office of the postal network. But, the carrier must still merge these odd pieces manually with the rest of the day's mail. That takes time, and makes the carrier less efficient.

At times, the volume of mail is substantially larger than normal. Either the total job is much larger than normal—in which case, sorting equipment cannot handle the total job in the usual fashion—which often results in a significant increase in manual labor. Or on other occasions, an individual address receives a much larger volume than normal. Normally, current sortation systems handle this situation by diverting the mail that exceeds the volume of a single bin into an overflow bin—and then completing the sorting job with manual merging, or by additional sortation requiring additional operator labor.

All of these situations require labor, and add to the cost and total job time for accomplishing the carrier delivery sequence sort job.

The following algorithms enhance the previously disclosed embodiments of a single pass sorting system that merges multiple streams of mail into a single stream, sorts by delivery sequence, and gathers all the mail for an address into a packet, wraps all mail destined for an address into a bundle, and unloads the bundled/wrapped/sorted mail directly into a mail tray. The algorithms are a series of twelve special operational algorithms that can be used with mail sorters—each of which augments the inherent automated capabilities and overcomes inherent limitations for more efficient job time and operating sequences. The result of each of these special algorithms is either less labor content, wider latitude per job, shorter job time—or in short, lower cost per job.

Some of these algorithms can generally be applied to a number of sorter types, and some are unique to the previously disclosed single pass delivery sequence sorter. The twelve algorithms are:

1. Time sharing the automated load cycle with the video encoding cycle with a single operator.

2. Measuring the thickness of each mail piece during the feed cycle, and allocating the number of interim unloading stations based on the composite thickness of all pieces to be stacked therein.

3. Diverting overly thick pieces to a manual bin after reading the address, then prompt the operator to add pieces manually to specific address bundles during the wrapping phase.

4. When loading overly thick pieces, to insure good unload performance, leave the adjacent divider empty to enable the bin divider to flex into adjacent spaces.

5. Manual insertion of mail pieces that cannot be singulated automatically, and thereafter, all processing steps are completed automatically in the same fashion for pieces fed automatically and pieces fed manually.

6. When an occasional job size exceeds the capacity of the sorter, operate in an algorithm that breaks the job into two batches of addresses automatically.

7. When an occasional job size exceeds the capacity of the sorter by only a small number of mail pieces, a manual operation which enables the operator to add the excess pieces manually at the wrapping step.

8. In an intelligent mail operation, when "time certain delivery" is required for any one mail piece, and the mail piece has arrived at this final sorting operation too soon, it can be culled out and set aside until the correct delivery time occurs.

9. Knowledge about the shape and size limitations of each mailbox along the delivery route could be added to the sorting data base of information. At the interim unloading step, the size of the bundle to be wrapped (thickness, dimensions, etc) could be adapted to insure that the bundle will fit into the box. Pieces that are oversized could be excluded from the bundle and handled separately.

10. When the mail for any address includes a mail piece that requires the signature of the recipient, exclude that piece from the bundle, and possibly attach it to the outside.

11. Offer a service to marketing mailers—for an extra charge the post will assure that your mail piece is located at either the front or the back of the bundle—so it is visible to the recipient even before they open the packet.

12. In a system which includes a printer for printing information on the outside face of the wrapper, offer a service to print advertising messages on the face of the wrapper—including multiple messages—targeted to individual recipients. (The wrapper becomes a message.)

Each of the twelve special operational algorithms augments the inherent automated capabilities and overcomes inherent limitations of mail sorters for more efficient job time and operating sequences. The result of each of these special algorithms is either less labor content, wider latitude per job, shorter job time—or in short, lower cost per job. Individually and collectively, they help make the basic concepts of single pass delivery sequence sorting and bundling mail into packets for each address much more attractive and competitive compared to the alternatives. And some of the algorithms introduce new features and capabilities that are not possible with alternative systems. Others introduce new capabilities that could be applied to all sorter systems. The unique advantage of each algorithm will be described below along with the descriptions of each algorithm.

The following is a brief description of what each algorithm is, how it works, and why it is an improvement over the alternatives.

1. Time sharing the automated load cycle with the video encoding cycle:

In conventional sorters, (and even in potential "one pass" sorting systems) once a mail piece is fed and its address read, it must be acted on in some way. Generally, when the address is readable, the mail piece is delivered directly to the correct sorter bin. When the mail piece is not readable, and the image must be sent to a video encoding station for interpretation, the piece must be delayed somehow since it is not known which is the correct bin to deliver it to. So, the piece first passes through a printing station which prints a bar code (usually on the back of the piece), and is then sent either to a loop to keep it in motion until the video encoding takes place, or it is sent to a temporary bin. In this second case, the unreadable pieces must be re-loaded, refed, and the newly printed bar code is re-read after the video encoding has taken place. The keyed in address is associated with the new bar code printed on the piece. These extra steps extend the job time and the labor content, require special handling of pieces that cannot be read by the automatic address reader, and add cost to the system for the extra loops of paper path, the extra diverter and dedicated bin for storing unreadable mail, the extra printing station for applying the bar code, and possibly the extra reader to read the applied bar code during the second pass of the mail piece.

In the instant invention, no special treatment is required for unreadable mail pieces, and generally, no additional time or personnel are required to accomplish the video encoding for unreadable addresses. The system does exactly the same thing to unreadable mail pieces as it does for readable mail pieces—e.g. feed, transport, capture the image, and insert the piece into the next available holding station on the endless loop of holding stations. The same (very short) paper path applies to all mail pieces whether the image is initially readable or not. When the image is readable, the controller remembers the address on the piece and the number of the holding station where it has been deposited. When the address is not readable, the controller remembers the location of the piece and sends the image of the address to the video encoding station for interpretation by the operator. The operator normally will interpret the unreadable addresses while the feeder continues to operate in automatic feeding, reading, and inserting the remainder of the mail pieces loaded onto the feeder belt. Once the operator keys in the correct interpretation of the address, that information is associated with the known location (holding station) of the piece. The video encoding time is shared with the automatic processing time for the feed/read/insert cycle.

The benefits of this encoding algorithm are significant. It is because the sorting occurs during the unload cycle that all mail pieces can be treated exactly the same by the paper handling mechanisms. No special loops are required, so the cost of these mechanisms is saved. No printing capability is required, no additional readers are required, no additional diverter gates or special storage locations are required—and so all the expenses and space associated with these functions in conventional sorters are not required for the instant invention. So single pass carrier delivery sorter in accordance with the instant invention can be less expensive and smaller. And, since, in normal operation, no additional time and no additional operators are required to accomplish the video encoding, the job time and the labor expense will be less than required with conventional sorting systems of equivalent speed and capacity.

2. Measuring the thickness of each mail piece during the feed cycle, and allocating the number of interim unloading stations based on the composite thickness of all pieces to be stacked therein:

Conventional sorters generally do not include a capability of bundling the mail into packets to be delivered to each address on the carrier route. That is a new capability of the sorter in accordance with the instant invention. It is also, however, a capability that the USPS has recently paid between 5 to 6 million dollars to four companies to develop for use throughout the postal system by 2008. So, these four companies will certainly develop an array of methods for accomplishing the bundling and wrapping of the daily mail for each address.

On average, about 5 mail pieces are delivered to each address each day, and the average thickness of this stack of mail is about 10 to 15 mm. This thickness can easily be handled by the mail carrier without discomfort. In fact, ergonomic science indicates that an average human can comfortably grasp and manipulate objects of about 2.5" thickness without discomfort if the weight is not exorbitant. So, in most circumstances, the bundle of mail for each address will fall into the comfort range for human manipulation during delivery. Occasionally, however, an address on the route might receive an extraordinary amount of mail—which might exceed the stack thickness of 2.5"—and therefore be uncomfortable for the carrier to manipulate. During times of heavy mail (such as Christmas), this could happen a lot, which might result in repeated stress injuries for the carrier if the carrier must deal with wrapped and bundled packets rather than individual pieces. With the current method, the mail is not wrapped into a single bundle, so the carrier copes with the thicker than normal pile of mail for an address by loading it into the mail box in multiple handsfull—each of which is comfortable to manipulate. It's the new capability of bundling the mail into a single packet that has the potential to create a new problem.

In accordance with this algorithm when each mail piece is fed and singulated, the thickness of the piece is measured. This information is remembered by the controller along with the address and the location information for the piece in the array of holding stations. When all pieces are fed and stored in the holding stations, the controller then determines how the mail will be unloaded into the interim unloading stations. Normally, all the mail for a single address will be unloaded into the same interim unloading station. However, before initiating the unload sequence, the controller does an additional calculation of adding up the thickness of all mail pieces to be delivered to each interim unloading station. If the sum of the thicknesses exceeds a predetermined thickness (such as 2.5"), then the controller assigns one or more adjacent interim unloading stations to receive the mail for that address. During the final wrapping and stacking step, certain addresses will then have two or more packets—each of which will be ergonomically comfortable for the carrier to handle during delivery. And, since the wrapping station may have a printer for printing barcodes, addresses, alerts, etc on the outside of the wrapper, that same printer could print a message to the carrier that there are two wrapped bundles to be delivered to this address today.

3. Diverting overly thick pieces to a manual bin after reading the address, then prompt the operator to add pieces manually to specific address bundles during the wrapping phase:

4. When loading overly thick pieces, to insure good unload performance, leave the adjacent divider empty to enable the bin divider to flex into adjacent spaces.

The following is a description of algorithms 3 and 4. In the Carrier Delivery Sequence Sorter and packet wrapping system previously described herein, the endless loop of holding stations is an important element of the sorter design. This system must be designed with two key specifications in mind: the total number of mail pieces per sorting job, and the maximum thickness of the mail pieces that the system will handle successfully in an automated operation. It is also important that the system have a footprint that is quite small compared to the available alternatives. It should be noted that the footprint is affected by these two key specifications mentioned previously: the number of mail pieces per job determines the number of holding stations required, and the thickness of the pieces to be accommodated by the holding stations determines the pitch of spacing between the holding stations. Since the holding stations are arrayed in an endless loop, an array with a larger number of holding stations, or with thicker holding stations, (or both) will require larger footprint. So, in order to keep the footprint as small as possible, it will be desirable to keep the pitch between holding stations as small as practical. So, for example, the average thickness of mail is about 2 mm. If the total job requirements for the sorter is to handle up to 2000 mail pieces per route, then the total length of the endless loop of holding stations will be 4 meters long, plus the thickness of the holding stations. This system would result in quite a small footprint. However, if the average piece thickness is 2 mm, such a system will not accommodate the half of the mail that is thicker than 2 mm—and these pieces would need to be handled on an exception basis. On the other hand if the system were designed to accommodate the thickest mail expected—so that no pieces would need to be handled on an exception basis, then the footprint of the system would be significantly greater. So, for example, if the thickest mail piece is expected to be 25 mm, then the endless loop of holding stations for the 2000 mail pieces would be 50 meters long—and would require a foot print 12.5 times as large as the previous example. So, the system must be designed to accommodate the most number of mail pieces with the fewest exceptions for being thicker than the system can accommodate, with the smallest footprint. Without trying to select design parameters at this point, suffice to say that a likely design compromise will result in the need for exception handling of pieces that are thicker than the system can accommodate in automated processing. The algorithms 3 and 4 address these needs.

For the purpose of illustrating the algorithms, let us use an example of how a typical system might be designed. Suppose that the spacing between the holding stations was designed to be 8 mm thick. And the holding stations are designed with flexible walls, so they can deform to accommodate mail pieces up to 12 mm thick. And further suppose that about half a percent of the mail exceeds this thickness of 12 mm. That means that in a typical job of 2000 pieces, a total of 10 pieces will exceed the thickness limit for automated handling, and will need to be accommodated using the algorithms.

As disclosed in algorithm 2 above, the thickness of each mail piece is measured shortly after it is fed. On the way to being inserted into the next available holding station, the address is also read. Algorithm 3 uses these two pieces of information to facilitate the processing of overly thick pieces in a way that simplifies the total job. The algorithm can be described as follows: overly thick pieces are diverted into a special holding bin which is not part of the endless loop of holding stations. The remainder of the job is processed in a normal fashion. The address of each of the diverted oversized pieces is known. During the final bundling/wrapping/unloading operation, when the system comes to an address for which an overly thick piece is to be delivered, the system pauses and provides a prompt to the operator to manually remove the piece from the holding bin and place it on the stack about to be wrapped in the wrapping station. Having completed this prompted manual step, the operator presses a resume button, and the system proceeds to wrap the entire bundle—including the mail processed automatically, and the piece added to the bundle manually. The system then continues in the normal cycle of unload bundles and wrapping them in a normal fashion until the packet for the next address having an oversized piece reaches the wrapping station—at which time the operator is prompted to manually add the next overly thick piece. The prompts can be audible or visual signals. But, generally, this algorithm provides an efficient way to merge a few manual operations with the automated handling of mail in a fashion that optimizes efficiency by reducing total job time.

Algorithm 4 addresses this same problem in a different way. If we assume the same design parameters of 8 mm pitch on the holding stations to accommodate 12 mm thick mail, then the 10 exception pieces per job (thicker than 12 mm) could be handled in a different way. It was previously assumed that the walls of the holding stations were flexible, and could easily bend to accommodate pieces that are thicker than the pitch between the holding stations. So, for the sake of illustration, let's ignore the wall thickness of the holding stations. And suppose that three adjacent mail pieces had thicknesses of 2 mm, 18 mm, and 2 mm respectively. The sum of the pitch of three holding stations at 8 mm each will be 24 mm, and the thickness of the mail to be loaded into those three holding stations is only 22 mm. So, as long as the walls of the middle holding station can flex into the (unneeded) space of the first and third station, all three pieces can be accommodated automatically. However, if each of the three mail pieces were measured at 20 mm thick, and the system loaded these three pieces into adjacent holding stations, the three pieces would likely become stuck in the holding stations—and the system would not be able to unload these pieces into the interim unloading stations because of high drag forces between the mail pieces and the walls of the holding stations. This will result in a system malfunction.

Algorithm 4 addresses this possibility, again using the information about the thickness of each mail piece. The algorithm creates rules for insertion into holding stations based on the measured thickness of previously loaded pieces. An example of such a rule might be this: whenever the running total of the thickness of previous three mail pieces exceeds the pitch of three holding stations, then leave the next holding station empty and load the next mail piece (regardless of how thick) in the holding station beyond the empty one. Generally, algorithm 4 can be summarized as follows: using measured thickness information, and following a prescribed set of rules, leave selected holding stations empty to insure that overly thick mail pieces can easily slide out of the holding stations during the unload operation. The benefit of algorithm 4 is that more mail pieces of greater thickness can be handled automatically, fewer will need the manual handling, and the pitch between holding stations can be designed to be smaller in order to keep the overall system footprint small.

5. Manual insertion of mail pieces that cannot be singulated automatically, and thereafter, all processing steps are completed automatically in the same fashion for pieces fed automatically and pieces fed manually:

This algorithm addresses a similar problem to the above issue of how to handle pieces that are too thick. While the singulator envisioned for the sorter of the instant invention has world benchmark latitude (i.e. it can handle the widest range of mail piece types of any known technology), there will always be exceptions—pieces that the feeder cannot handle automatically. For example, odd shaped pieces (such as in the shape of a heart, banana, Easter bunny, etc) can now be mailed at a premium postage. The feeder may not be able to singulate these successfully. There are likely to be other exceptions such as newspapers, and possibly poly-wrapped periodicals that the feeder cannot singulate automatically.

As described above, a manual feed capability is provided for these pieces. All of the subsequent processing (unloading into interim unloading stations, bundling/wrapping, and stacking into mail trays) can usually be done automatically once the pieces are loaded into the holding stations manually (and passed by an address reader). In conventional sorters, these pieces that cannot be automatically fed cannot be automatically handled in any of the other sub-systems of the sorter either. In the system described herein, only the first step (singulation) must be done manually. All other steps can be completed automatically.

Algorithm 5 proposes a method for accomplishing this manual step without adding to the total job time. The operating procedure is this: the operator loads all of the machineable mail on the feeder belt and initiates the automated feed sequence. The pieces that the operator recognizes as not feedable automatically are set aside for manual insertion. Once the automated feeder is in operation, the operator takes the exception pieces to the manual loading station and begins to insert them into the system one by one. Each piece passes an address reading station, and is loaded into a holding station. It is assumed that the manual inserting station is located along the endless loop path of the holding stations a significant distance away from the load station associated with the automatic feeder. In this way, the holding stations near the manual insertion station will be empty until very late in the job—long after the manually loading operations are completed.

However, since the manual loading station is located just upstream of the automated loading station, some of the holding stations loaded at the manual station will pass by the automated loading station shortly thereafter. Since the controller knows the location of each holding station, and which have been loaded with a mail piece, when a filled station arrives downstream at the automated loading station, the controller just advances the endless loop to the next empty holding station for the next piece being fed by the automatic feeder.

The benefit of Algorithm 5 is that the time for loading the non-feedable mail manually is shared with the time for the automated feed cycle. No additional time, and no additional operators are required—in most cases. Of course, there will always be exceptions. For example, if the number of pieces that cannot be fed automatically becomes a significant percentage of the total number of mail pieces, the time to manually load these exception pieces could exceed the time to automatically load the automatically feedable pieces. In this case, some of the time will be shared between the manual and automatic feed operations, and some of the manual feed time will be incremental, and add to the total job time.

6. When an occasional job size exceeds the capacity of the sorter, operate in an algorithm that breaks the job into two batches of addresses automatically.

One of the system design parameters will be to select the number of holding stations on the endless loop to exceed the number of mail pieces to be sorted for each job. As with algorithm 3 and 4, the number of holding stations designed into the system affects both the footprint and the cost of the system. So, it will be desirable to design the system with enough holding stations to accommodate some very high percentages of the jobs (for example, 98%), and then develop algorithms to assist in handling the few times when the number of mail pieces in the job exceeds the number of holding stations available. This is expected to be a periodic or perhaps seasonal phenomenon. For example, mail volume rises before Christmas, and at certain times of the month.

Algorithms 6 and 7 can be used when the number of mail pieces in a job significantly exceeds the number of holding stations. So, assume that the carrier knows that the sorter system was designed for jobs with a maximum of 2000 mail pieces to be delivered to 400 addresses, but on one day, 2500 mail pieces arrive to be sorted and bundled. In this situation Algorithm 6 will be employed as follows: first an estimate is made on the number of addresses that cannot be sorted on a first pass. A comfortable margin for error should be included in this estimate. So, we know that there are 25% more mail pieces than the system can handle—so with some margin for error, the system or operator should assume that about 35% of the mail will be handled in a second pass. This really means that the last 35% of the delivery addresses will require a second pass.

Given this determination, and given the situation of the mail is entirely random before the sorting operation begins, the operator proceeds to load as much of the mail into the automated feeder as will fit, and starts the automated feeding sequence. The operator can then manually load the non-machineable pieces per algorithm 5. In this situation, once the automated feeder has fed some of the mail, thereby making space on the feeder loading belt, the remainder of the mail can be loaded as the feeder continues to feed.

Each mail piece is fed (either automatically or manually), and the address read, and is loaded into a holding station. When the controller identifies the address on the mail piece as belonging to the last 35% of the addresses on the carrier route, the mail piece is unloaded into one of the interim unload stations as soon as that portion of the endless loop of holding stations arrives at an interim unload station that has room for stacking additional pieces. So, in the first feed pass, all of the mail pieces are fed, read, and loaded into the holding stations. Those with addresses in the first 65% of the carrier route remain in the holding stations. Those with addresses in the last 35% of the carrier route are ejected into the interim unloading stations as soon as possible—but while the feeding cycle continues. So, some of the holding stations will be loaded and quickly emptied. These will be cycled around past the feeder a second time for re-loading with a new mail piece. If the new piece is in the first 65% of the addresses, it remains in the holding station until the next step in the process. If the new piece is in the last 35% of the addresses, it is also ejected into the interim unloading stations, thereby making an empty slot for a third piece if necessary.

All of the mail ejected into the interim unloading stations is then advanced to the final stacking station—and, without wrapping, is stacked into mail trays for processing in a second pass. So, the mail that remains in the holding stations is now all of the mail to be delivered to the first 65% of the addresses. The sorter system operates on this mail in the normal sequence—and the result is a complete sort, merge, wrap by address, and stack into the mail trays for the first 65% of the addresses. At this time, the sorter is empty. The mail for the last 35% of the addresses is then loaded in the feeder and processed in an identical fashion—resulting in sorted, merged, wrapped, and stacked mail for the last 35% of the addresses.

In short, Algorithm 6 enables sorting larger than expected jobs in two passes, on an exception basis. It is expected that most of the jobs will not require this algorithm, and will be handled in a single pass.

7. when an occasional job size exceeds the capacity of the sorter by only a small number of mail pieces, a manual operation which enables the operator to add the excess pieces manually at the wrapping step.

Algorithm 7 addresses this same situation as Algorithm 6, but will be used when the number of mail pieces exceeds the number of holding stations by a small number. Suppose the operator estimates that the mail, when loaded on the feeder belt, is close to but a smaller number than the design capacity of the sorter (no of holding stations)—and the estimate is wrong. In this situation, the wrong estimate will not be known until the endless loop of holding stations is completely filled, and there are a number of mail pieces remaining on the feed belt—which cannot be processed. At this point, the operator has a choice to make. By looking at the number of pieces remaining to be fed, if it is a large number, the operator can elect to use the previously described Algorithm 6 at this time. The system will eject the mail for the last % of addresses to open space for the rest of the mail to be fed—and the system will proceed as previously described in Algorithm 6. But, if there are only, say, 10 extra pieces remaining on the feed belt, the operator can elect to proceed using Algorithm 7.

In this case, the feeder feeds the last 10 pieces, reads the addresses, and diverts them into the same bin as used for overly thick pieces described in Algorithm 3. So, the controller knows about each of the excess pieces (thickness, location, address). The job proceeds normally up to the wrapping step. When the mail for a specific address includes a piece that was previously diverted into the manual bin, the system stops and gives an audible or visual prompt to the operator to add the piece to the stack manually before the mail for that address is wrapped and stacked. This algorithm is quite similar to the one used in algorithm 3 for overly thick pieces. And in fact, there is no reason why both Algorithm 3 and Algorithm 7 cannot be employed simultaneously. The benefit is that the bulk of the processing continues to be done automatically and at high speed. And for the exception pieces, the operator actions prompted by the system can be used to complete the job with only a small addition of time. These algorithms make both the operator and the system more efficient while enabling completion of a wider range of jobs with a wider diversity of mail piece types.

8. In an intelligent mail operation, when "time certain delivery" is required for any mail piece, and the mail piece has arrived at this final sorting operation too soon, it can be culled out and set aside until the correct delivery time occurs:

Several concepts are possible to insure that the mail arrives at the intended destination on exactly the predicted day—guaranteed. This has value for marketing campaigns in which the mail arrival date is intended to coincide with newspaper or television advertising, or some other date certain event.

If the mail piece arrives too late at this last sorting station prior to delivery, nothing can be done to make up for lost time at this point. But, it is far more likely that occasional mail pieces will arrive too early. In this case, the date certain information embedded in the various markings on the "intelligent mail piece" can be read by readers on the sorter, and the read information compared with the current date. If the mail piece has arrived at this point too early, it can be diverted out of the mail stream before entering the holding stations. The system can provide an operator prompt to hold this mail piece until the appropriate day, and merge it with that day's mail for processing and delivery.

9. Knowledge about the shape and size limitations of each mailbox along the delivery route could be added to the sorting data base of information. At the interim unloading step, the size of the bundle to be wrapped (thickness, dimensions, etc) could be adapted to insure that the bundle will fit into the box. Pieces that are oversized could be excluded from the bundle and handled separately.

One of the limitations of the DPP process (delivery point package) being developed by the post, and which is addressed herein, is that wrapped and bundled mail may not fit in all of the mail boxes on the delivery route. For example, some mail is pushed through a fairly narrow slot in a door, some is loaded into small boxes affixed to the side of a house near the door, and some is deposited in relatively large boxes on the street. If the wrapped packet of mail is either too thick to fit through the door, or contains a piece too large to fit into the slot in the door, or the small mail box next to the door, the delivery of the packet will be less efficient than if the pieces are handled individually as is done currently.

Algorithm 9 adds to the database information for each route additional information about the type and size of the mail boxes along the delivery route. So, if it is known that address number 163 along the carrier route has a small slot in the door that can only handle bundles that are less than 25 mm thick, and less than X or Y dimension for length and width, this information can be used to direct the sorting system to create individual bundles that will accommodate the type of mail box. So, for example, if today's mail going to address number 163 along the route has a bundle that will exceed 25 mm thickness, then the system will automatically assign two interim unloading stations for that address so that two wrapped packages are created—each less than 25 mm thick.

Length and width information can be measured on each mail piece during the feed/read/insert cycle. If the mailbox at address 163 along the route can only handle mail pieces that are 200 mm wide, and a piece for that address is measured to be 250 mm, then that piece can be diverted to the manual bin (described in algorithm 3). When the mail for that address arrives at the wrapping station, the system prompts the operator to add the mail piece to the stack of mail after the remaining pieces have been bundled and wrapped. In other words, the oversize piece is excluded from the bundle. In this way, the carrier can possibly insert the oversized piece through the slot by bending only that piece (and not by trying to manipulate the entire packet.) What distinguishes Algorithm 9 from Algorithms 3 and 7 is that in this case the mail piece is excluded from the packet but stacked in order—whereas in Algorithms 3 & 7, the mail piece is added to the packet and wrapped up with the other pieces going to that address.

Since the wrapping station may have a printer for printing barcodes, addresses, alerts, etc on the outside of the wrapper, that same printer could print a message to the carrier that there are multiple wrapped bundles to be delivered to this address today, or that X number of loose pieces must also be delivered to this address today.

10. When the mail for any address includes a mail piece that requires the signature of the recipient, exclude that piece from the bundle, and possibly attach it to the outside.

This algorithm is similar to algorithm 9, except it applies to pieces that require the carrier to take some special action such as getting a signature during the delivery. As with Algorithm 9, the piece can be diverted into the manual bin during the sorting operation, then manually added to the final stack when prompted by the system—outside the packet of mail going to the same address. By locating the piece requiring signature outside the packet, the carrier will not need to open the packet to retrieve the piece needing the signature. A method of affixing the piece to the packet with an adhesive can also be part of Algorithm 10.

11. Offer a service to marketing mailers—for an extra charge the post will assure that your mail piece is located at either the front or the back of the bundle—so it is visible to the recipient even before they open the packet.

Since a significant portion of the mail to be delivered to each address is "marketing mail", a potential new service could be offered by the postal service to insure that a certain mail piece appears on the top of the stack or on the bottom—to that the message on that piece is seen first by the recipient. There could be an extra charge for this service. So, algorithm 11 describes a method for accomplishing this service on the single pass sorting system. It is assumed that the information that a certain mail piece is to go on the top of the stack will be encoded somewhere on the face or back of the mail piece, and this information will be read by the address reader or other reader before the mail piece is inserted into the holding stations. In ordinary operation, during the ejection into the interim unloading tray operation, the order of the mail pieces into the interim loading tray is unimportant. It is only important that all the mail for that address be ejected into the interim loading station during one rotation of the endless loop of holding stations. However, if one of the mail pieces needs to be on top or bottom of the stack, an extra rotation of the endless loop will be required. This will add to the sorting job time, which means that the USPS will charge enough extra for this service to compensate for the increased job sorting time. The benefit of Algorithm 11 is that the positioning of the piece on top or bottom of the bundle is accomplished automatically—with no manual labor required.

12. In a system which includes a printer for printing information on the outside face of the wrapper, offer a service to print advertising messages on the face of the wrapper—including multiple messages—targeted to individual recipients. (The wrapper becomes a message.)

Algorithm 12 is straightforward, and easily understood. The USPS is currently selling advertising space on the sides of its trucks and other places to raise revenue. Since, as disclosed above, the wrapping station of the carrier delivery sequence sorter further includes a printing station to print bar codes, addresses, alerts to the carrier, etc, that same printer could print advertising messages on the wrapper. And the message could be tailored to the address. This service will be like sending an advertisement without having to pay for the materials to create the piece.

III. Carrier Delivery Sequence Sorter—Parallel Processing Configuration

Heretofore, a single pass carrier delivery sequence sorting system has been described that merges multiple streams of mail into a single job, sorts by delivery sequence, and unloads the sorted mail automatically directly into a mail tray—and wraps the mail and prints information useful to the carrier during the delivery process.

Alternatives exist to achieve delivery sequence sorting. Typically, letters (only) are sorted at speeds of up to 40,000/hour. These are multi-pass sorting systems that require manual sweeping and re-loading of the feeder at least once per job. But because of the very high speeds of operation, the total job time can be relatively short. Typically, if the sorter has 100 or so bins, 20 or 30 routes can be sorted into delivery sequence in a two pass operation. The total job time for one route might be as low as 10 or 15 minutes.

The limitations of this system include the very large footprint (and cost) for the equipment. But more importantly, the very high speed of operation is precisely the reason why this automated mail handling equipment has very limited latitude, and is not suitable for integrating all of the mail streams into a single pass piece of equipment.

Sorting many types of mail cannot yet be fully automated at the USPS. That includes unwrapped periodicals (such as TV guide and Time Magazine), and advertising mail that has loose corners (example, tabbed in the center) that can catch and jam in the automated processing equipment, etc. Most high speed sorters have operating speeds of up to 200 in/sec. At those speeds, the aerodynamic effects on the mail pieces become very important. Mail that can be handled successfully at very slow speeds becomes much more likely to jam at very high speeds because of the Bernoulli forces acting on the loose corners and causing them to snag during transporting.

Because of these limitations, less than half of the mail can be processed on the very high-speed automated equipment today and sorted to final delivery sequence. In fact, on a typical day, 42% of the mail is "machineable". This mail is processed at the very high speeds quoted above. But the other 58% of the mail that is either not machineable, or is only partially sorted by machine and must be cased (hand sorted) by the carrier the morning of delivery. This process takes about two and a half to three hours of the carrier's day—time not spent delivering the mail.

What is desired is a system that has both very high latitude to handle all of the mail to be delivered, and very high speed—(with a very low shut-down rate). The current sorting equipment has very high speed, but very low latitude. And it requires significant manual labor for sweeping the bins and reloading for the second pass. The single pass sorter system had very high latitude, but operates at relatively slow speeds in order to accommodate the full range of mail. What is really needed is not higher speed of operation, but shorter job time for sorting the same amount of mail.

U.S. Pat. No. 5,042,667 entitled Sorting System For Organizing In One Pass Randomly Order Route Grouped Mail In Delivery Order, which issued in 1991, describes a single pass mail sorting system. Specifically, the Keough patent describes a process of feeding mail past a reader and inserting it one piece at a time into an endless loop of temporary storage bins, then unloading it in the correct sequence from these storage bins. The limitations of the Keough approach is that there is only a single loading point and a single unloading point from the endless loop of temporary storage bins and many passes of the endless loop is required to do the sequence sorting. Therefore, in order to achieve low job times, this system must operate at very high speeds. The system ability to handle a wide latitude of mail piece types is therefore questionable at best.

The instant invention reduces the total job time for a sorting job on a single pass delivery sequence sorter system providing the ability to accomplish a number of operations on systems operating in parallel. Referring to FIG. 8, examples include providing multiple feeders to singulate, read, and load mail pieces into the array of bin separators (temporary storage bins). A second example is to provide multiple unloading stations to that mail can be extracted from multiple positions around the continuous loop of temporary storage bins simultaneously. A third example is to provide multiple stations at which the mail can be unloaded, wrapped, and stacked in mail trays. Because all of these operations are performed by multiple systems operating in parallel, the mail handling speeds can be kept quite slow, but the total sorting job time can be accomplished quite quickly. This will enable the system to process a wide range of mail without risking jams or other shutdowns due to the aerodynamic effects of very high speed processing.

In a single pass sorting system capable of merging multiple streams of mail, sorting by delivery sequence, and gathering all the mail for each address into a wrapped packet, fast total job time is accomplished by providing multiple subsystems to perform similar functions in parallel. The total job time is comprised of three steps: first, feeding/reading/and inserting mail pieces into an endless loop of temporary storage dividers (one piece per divider); second, unloading the mail from the storage dividers in the delivery sequence order into interim loading stations; and third, unloading the mail from the interim loading stations, bundling and wrapping it in one or more packets for each address, and stacking the packets into mail trays. The instant invention provides multiple (similar) subsystems for each of these steps in order to reduce the time to complete a sorting job. Specifically, multiple feed stations, multiple interim unload stations, and multiple wrap and stack stations are provided. By employing multiple stations for each step, the mail transport velocity of the system can be kept quite slow, and therefore the range of mail piece types that can be handled will be much broader than for systems that operate at significantly higher speeds.

The advantage of this improvement can best be illustrated by example. A sort job of 2000 mail pieces sorted into 400 addresses is estimated to take approximately 37 minutes. This estimate assumes that the system included one mixed mail feeder used in the Mixed Mail Manager (M3) Sorter manufactured by Pitney Bowes Inc. of Stamford, Conn., USA, which is the world benchmark for latitude and reliability. It was further assumed that this feeder would operate at 8000/hour. The desirable feature of automatically feeding intermixed mail (flats, letters, postcards, periodicals—all randomly intermixed) needs to be preserved for this (mail merging) application. But, for practical acceptance by the USPS, the instant invention may be required to complete an entire sorting job in 10 to 15 minutes. That is a problem because the 2000 piece job takes 15 minutes (at 8000 feeds per hour) just for the feed/read/insert function. This will need to be reduced to about 5 minutes in order to achieve a total job time of 10 to 15 minutes. Rather than speed up the feeder to the point where the desirable wide latitude is lost, it is preferable to increase the number of feeders. So, for example, if the sorter were designed with three feeders (plus a manual insertion station as previously disclosed), and each were loaded with 667 mail pieces, then the total feed/read/load time could be reduced to 5 minutes without increasing the velocity of the mail.

For the sort-on-unload feature of moving the mail into an array of interim loading stations, the more stations included (i.e., the more addresses to be unloaded in a single rotation of the loop of interim storage bins), the shorter the overall job time. And, in the final step of wrapping and stacking the mail for each address, when more of these systems are used in parallel, the total job time is shortened.

A further benefit of this architecture is that the cost of the address reading system increases dramatically as the mail velocity increases. By keeping the velocity at a relatively slow speed (about 30 in/sec) past the reading station, a lower cost reading systems can be deployed. At the slow speeds, the cost of four such systems is likely to be much less expensive than the cost of two systems that operate at much higher speeds.

An additional benefit is that a fault in any one feeder, unload station, or wrap/stack station will not result in a system shutdown. The other subsystems can continue to perform the same functions to process the job while the fault in one subsystem is being corrected. Also, a service call on one of the subsystems will not disable the entire system.

As described in the above, multiple M3 feeders could be deployed to reduce the feed time. It is also quite possible to deploy an array of feeders that are not identical to each other, but rather, each designed to do a specific function well. So, for example, a commercially available high-speed letters-only feeder could be used to feed the letter mail at relatively high speed (say 20,000 letters per hour.) A second, slower feeder could be dedicated to feeding flats. And a third feeder might be the M3 feeder, capable of feeding either flats or letters, or a mix. And a fourth feeder might be the manual feed station. In this system, the operator could load the mail into the system best suited for feeding that type of mail.

The multiple interim unload stations, and the wrap and stack stations are adequately described above and shown in the FIG. 8. All other sorters operate in strict serial fashion. One mail piece is fed at a time. The mail pieces proceed in a queue past reading stations, and then get diverted into one or more paths to the sorting bins. It is because the operation of the route sequence sorter is divided into three sequential functions (feed/read/load followed by unload in the correct sequence, followed by wrap and stack operations), all of these functions can be accomplished in a shorter time at slower speeds by increasing the number of parallel stations to accomplish each function simultaneously.

IV. Carrier Delivery Sequence Sorter—More Algorithms

Postal carriers must accommodate two inefficiencies in the way they sort and deliver mail each day: merging pre-sorted standard class mail that has a three day window for delivery, and integrating parcel delivery with the mail delivery.

In the Destination Delivery Units (DDU=a local, "home base" postal facility where carriers sort and "case" their mail before delivering it), only 42% of the mail stream arrives already sorted by delivery sequence. Another batch of mail (44%) is manually cased (sorted by delivery sequence) by the carriers, including flats, periodicals, and non-DPS (destination point sorted) letters. The final 14% of the mail is drop-shipped mail. The drop-shipped standard class mail typically arrives at the DDU sorted by carrier sequence, but bundled separately. Examples of this type of mail include weekly newspapers, advertising brochures, etc). On average, 413 pieces of this type of mail are delivered each day by each carrier. Some carriers "case" this mail—meaning they manually sort it along with the "flats" mail. Other carriers load the bundles of drop-shipped mail into their trucks and merge it with the letter and flats mail while parked in front of each mailbox.

The drop-shipped mail is usually standard class, which must be delivered within a three-day window of its arrival at the DDU. The managers at the DDU usually decide which of the three days this type of mail will be delivered in order to smooth out averages for the total amount of mail delivered by each carrier each day. So, on a slow mail day, more of the drop-shipped mail is delivered, and on a heavy mail day, very little of it is delivered.

Sometimes, this type of mail is intended to be delivered to every address on the route. It may be addressed to "resident" but also include a specific street address on the address label. On the days when the DDU manager decides to include some drop shipped mail for delivery, each carrier figures out how to get the entire batch of drop shipped mail delivered on his/her route. Sometimes, for a number of addresses on the route, the drop-shipped mail is the only item to be delivered that day. So, the carrier must stop at each address—if only to deliver the drop shipped mail piece and nothing else. Since there is a three-day window allowed for delivery of this type of mail, this is certainly not the most efficient of methods. Nor is it the best use of the carrier's time.

A second somewhat related problem has to do with the parcel delivery by carriers. On a typical day, a carrier who has 500 addresses on the route may have perhaps only 10 to 20 parcels to deliver to those same 500 addresses. This averages one parcel for every 25 to 50 stops made by the carrier. Today, the carrier typically deals with this situation by arranging the parcels in route sequence order in the truck so that the next parcel to be delivered is nearest to the driver and easily visible. When the carrier arrives at the next address for which there is a parcel to deliver, he/she must remember to include the parcel with the letter and flats mail to be delivered to that address. But, sometimes the carrier forgets. And when the oversight is discovered, the carrier must backtrack to the correct address and deliver the parcel at a later time than he/she delivered the other mail to that address. This makes the delivery of parcels along with the mail quite inefficient; depending on how good is the carrier's memory or how often the carrier remembers to check the next address on the parcels remaining in the truck.

This embodiment of the instant invention reduces the total time a carrier spends delivering mail by improving two features previously described, i.e., a single pass sorting system that merges multiple streams of mail into a single job, sorts by delivery sequence, and unloads the sorted mail automatically directly into a mail tray—and wraps the mail and prints information on the wrapper which will be useful to the carrier during delivery.

The first improvement enhances the carrier efficiency when dealing with standard class mail with a three-day delivery window. After all of the other mail for the day is fed into the sorter and stored in the buffer, the system controller takes note of which addresses on the route have no mail for delivery today. Then, the operator notes how much empty space is left on the continuous loop of bin dividers in the sorter. If there is sufficient space left, the operator loads additional drop shipped material into the sorter, and keys in the date when the material must be delivered, which could be either three days or two days from the current date—or if the previous two days were heavy mail days and did not include any standard class drop-shipped mail, the operator may key in that this batch must be delivered today. As this material is being fed into the sorter and the address reader is reading the addresses, the sorter controller makes a series of decisions on how to deal with each piece of standard class mail. If a standard class mail piece is destined for an address for which there are already other mail pieces that have been inserted into the sorters buffer system, the sorter advances this new piece to the buffer for sorting to the address in the normal fashion. If a standard class mail piece is destined for an address that has no other mail pieces to be delivered that day, the controller then looks at the "deliver by" information previously keyed in by the operator. If this is the last day for delivery of that piece, the sorter advances that piece into the buffer for later sorting to the address in the normal fashion. If there are three or two days left before that standard class mail piece must be delivered, (and therefore this would be the only mail piece to be delivered to that address today) the sorter diverts the mail piece into a diverter bin for re-introduction into the sorter the next day. This increases the carrier's efficiency by eliminating the need to stop at those addresses on the route that only receive standard class mail (with time remaining on the three day delivery window) that day. This allows the carrier to complete the day's deliveries more quickly.

Figure 13:
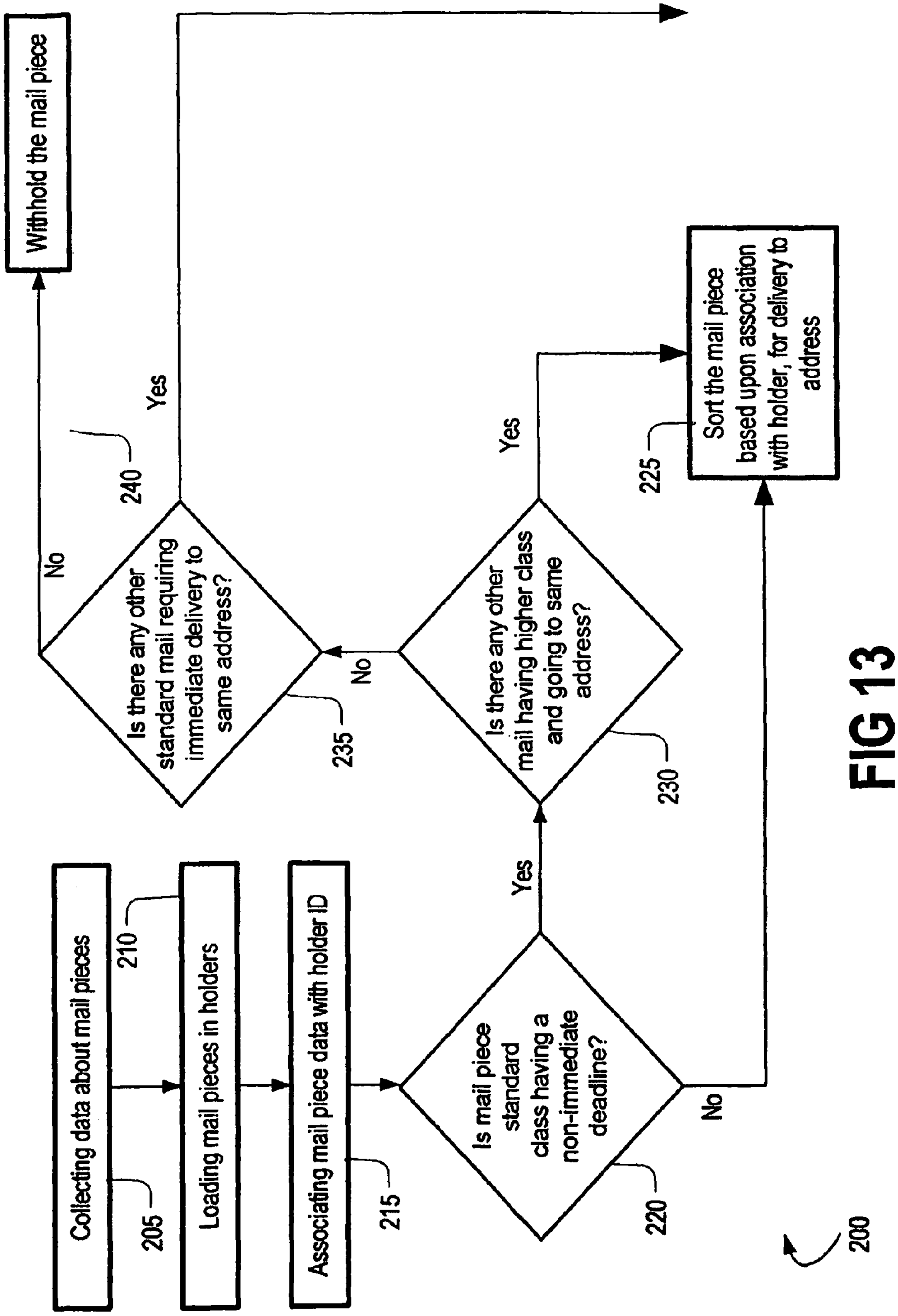
FIG. 13 is a flow chart describing a process according to one embodiment of the present invention.

This aspect of the present invention can be seen in FIG. 13, which shows a method 200 according to the present invention. Data about mail pieces is collected 205, and mail pieces are then loaded 210 into holders. An association is created 215 between each mail piece and its holder. If a mail piece is determined 220 to not be standard class or not have an immediate delivery deadline, then it is sorted 225 based upon the association with its holder for immediate delivery to a destination address. Otherwise, it needs to be determined 230 whether there is any other mail having a higher class and going to the same address; if so, then the mail piece is sorted 225 based upon the association with its holder for immediate delivery to a destination address. Otherwise, it is determined 235 whether any other standard mail requires immediate delivery to the same address; if so, then the mail piece is sorted 225 based upon the association with its holder for immediate delivery to a destination address. Otherwise, the mail piece is withheld 240 from delivery.

Likewise, a system for implementing this embodiment of the invention is also illustrated in the figures. As seen in FIG. 1, reader means 20 collects data about mail pieces, including data concerning the class of the mail piece and a latest delivery date. Holders 28 are each dimensioned for receipt of one mail piece. Controller 30 creates an association of the collected data concerning each mail piece with the respective holder into which the mail piece is loaded. The ejector mechanism shown in FIG. 6B acts as a withholding device by not ejecting a mail piece from a holder during normal sorting operations.

The second improvement uses the instant invention system's ability to print on the external face of the delivery packet wrapper. It is assumed that as the postal service improves the track and trace capability on parcels, it will create a daily database on parcels to be delivered that day. If this data is available, it can be merged with the database on the other mail pieces for each address, generated by the sorter controller as the pieces are being fed into the sorter. When a parcel is to be delivered to an address having other mail, a reminder to deliver the parcel is printed on the external face of the wrapper for that other mail. If there are multiple parcels to be delivered to an address, the number of parcels is printed on the mail packet wrapper. This will prompt the carrier at each delivery address to include parcels in the delivery. This feature will drastically reduce the number of times that a carrier has to backtrack because he/she forgot to include a parcel on the initial stop at a mailbox on the route.

Referring to FIGS. 14A through 14C and 15A through 15C, two algorithms are provided for the sorter system to help eliminate unnecessary stops for a carrier during a day's delivery, and to reduce the number of times a carrier must backtrack to deliver a parcel. The algorithm 400, shown in FIGS. 14A through 14C, sets aside a standard class mail piece when more days are available for the delivery, and when it is the only piece of mail for an address on a particular day. This eliminates unnecessary stops for the carrier and makes the delivery more efficient. The algorithm 500, in FIGS. 15A through 15C, prints a reminder on the mail wrapper for a particular address if a parcel must also be delivered to the address that day. Let us now consider these two algorithms in greater detail.

Figures 14, 14A:
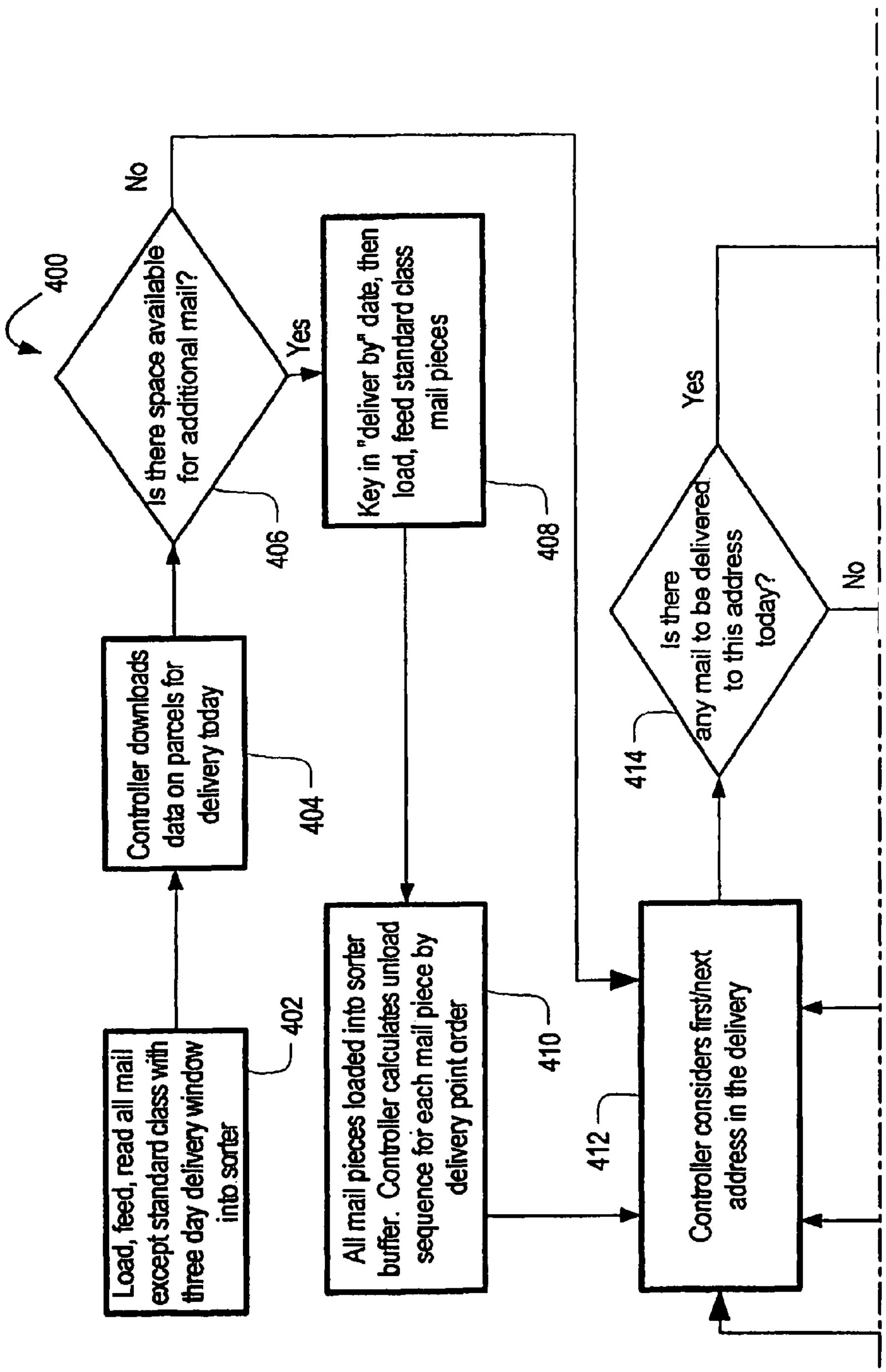
FIGS. 14A through 14C are a logic flow diagram illustrating a first embodiment for sorting standard class mail in accordance with the instant invention.

According to FIG. 14A, all mail except standard class mail (with three day delivery window) is loaded, fed, and read 402 into the sorter. Then a controller downloads 404 data on parcels for delivery today. It must be determined 406 whether there is space available for additional mail. If so, then a "deliver by" date is keyed in 408, and standard class mail is loaded, fed, and read; also all mail pieces are loaded 410 into a sorter buffer, and a controller calculates an unload sequence for each mail piece by delivery point order. However, if 406 there was is no available space for additional mail, then the process skips steps 408 and 410, and goes directly to the next step 412 in which the controller considers a first or next address in the delivery. Subsequently, it is determined 414 whether there is any mail to be delivered to this address today.

Figure 14B:
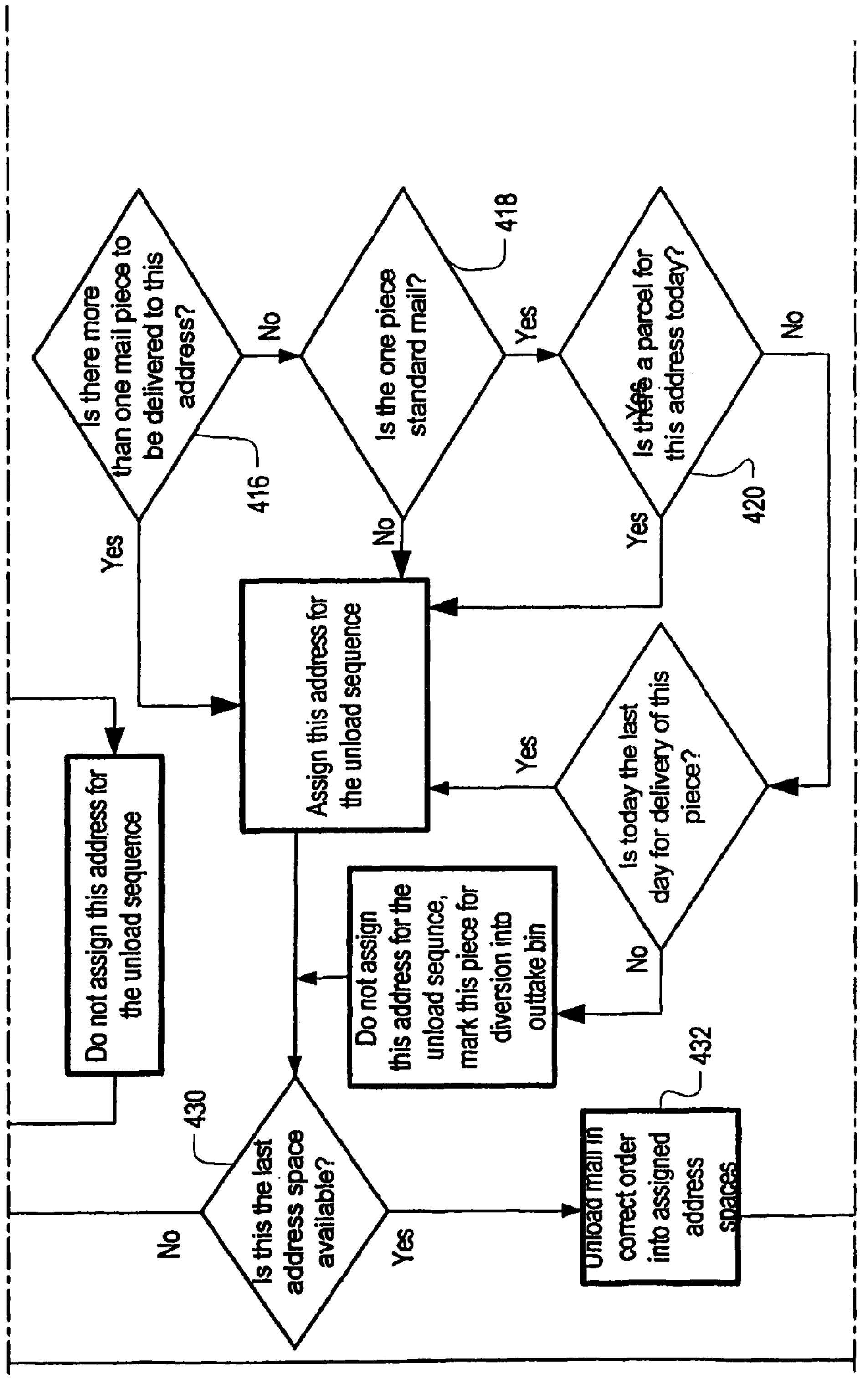
Figure 14C:
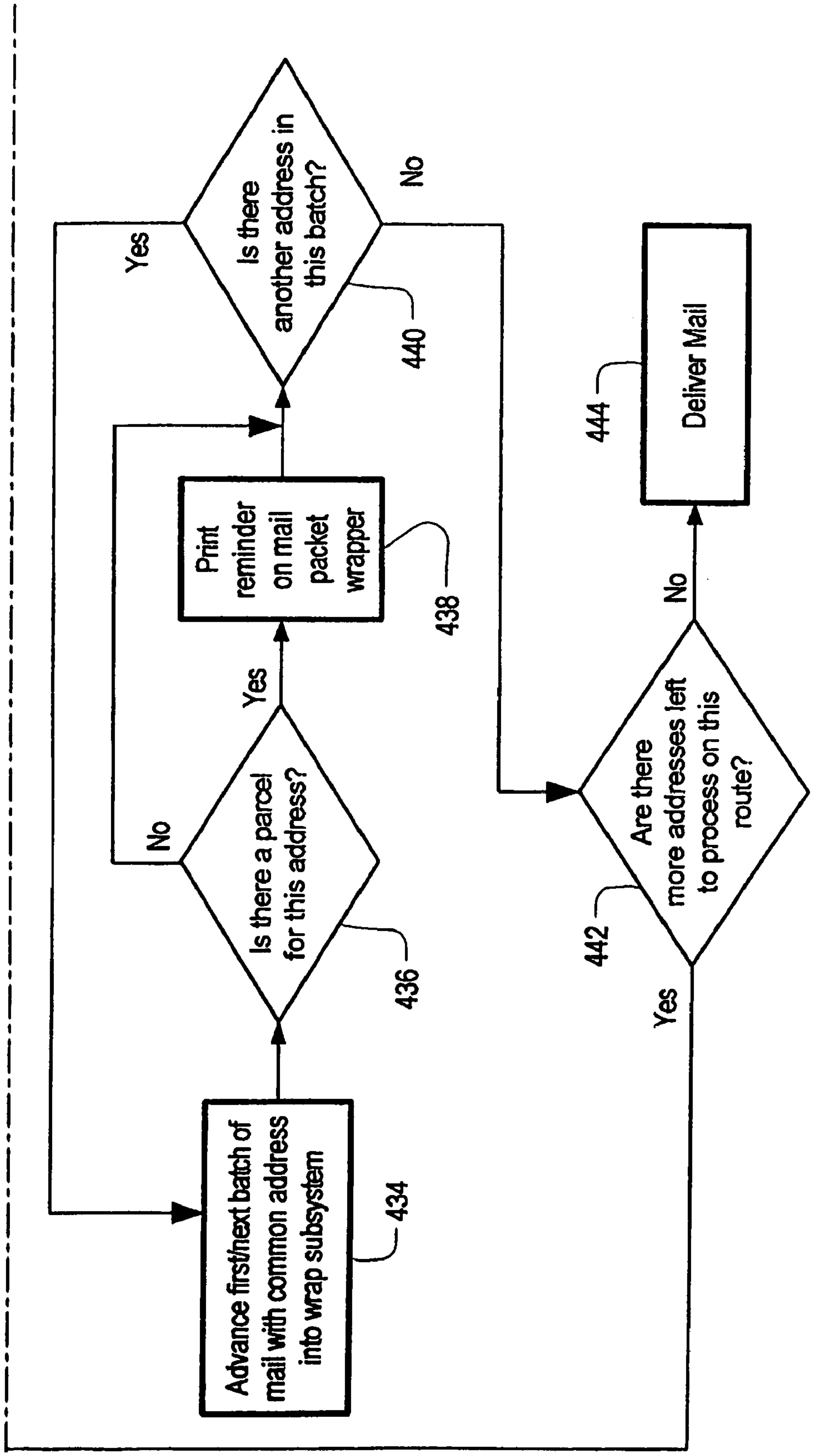

If so, then FIG. 14B shows a series of determinations 416, 418, and 420 in which it is determined whether 416 more than one mail piece are to be delivered to the address, whether 418 the mail piece in question is standard class, and whether 420 there is a parcel for delivery to this address today. Ultimately, when the last available address space is used 430, then mail is unloaded 432 in correct order into assigned address spaces, and the process proceeds as shown in FIG. 14C. A first or next batch of mail having a common address is advanced 434 into a wrap subsystem, and a reminder is printed 438 on the mail packet wrapper if 436 there is a parcel destined for this address. These steps 434-438 are repeated until 440 there are no more addresses in the batch. Even more of these steps are repeated until 442 there are no more addresses left to process on this route, at which time the mail is delivered 444.

Figures 15, 15A:
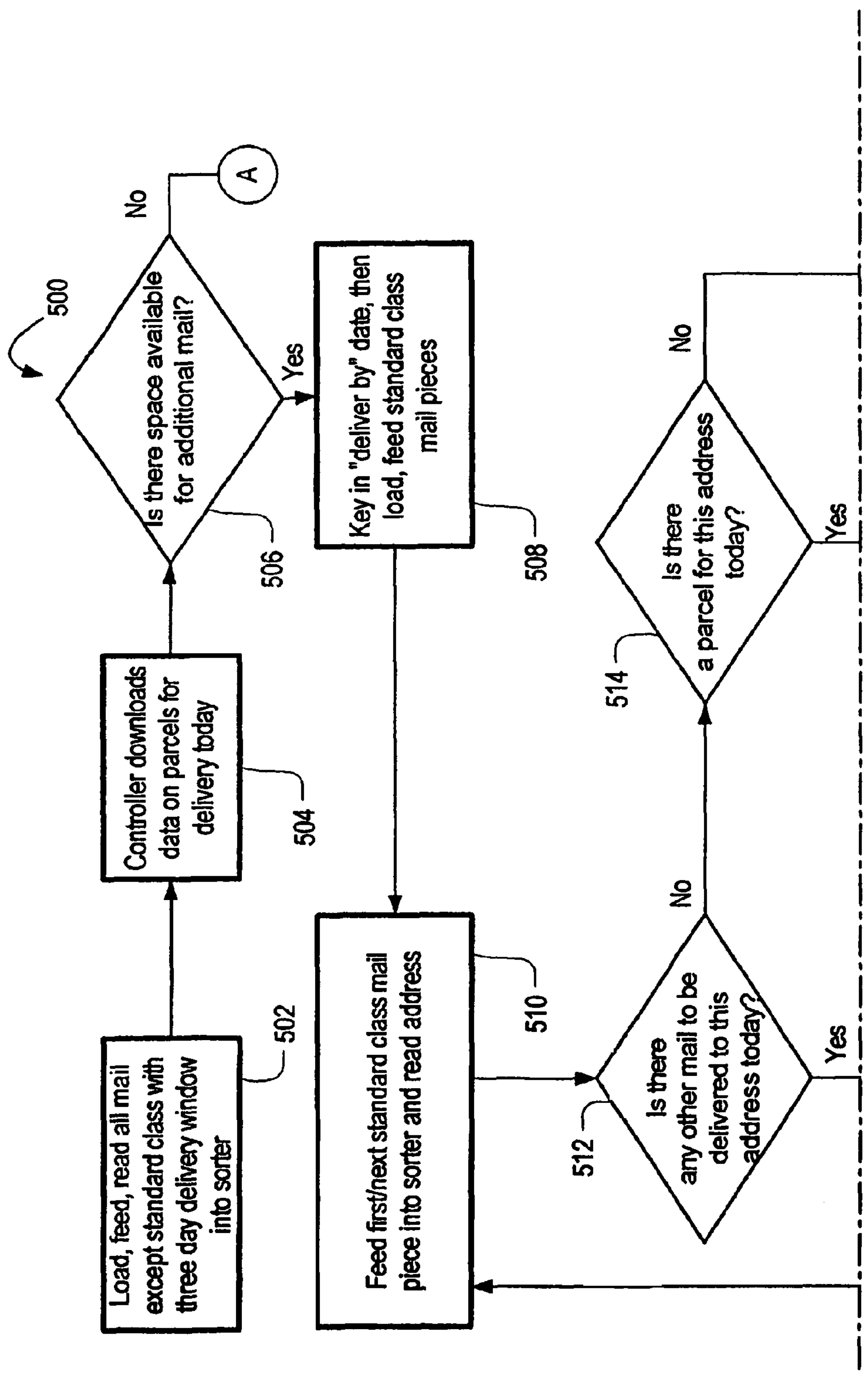
FIGS. 15A through 15C are a logic flow diagram illustrating a second embodiment for sorting standard class mail in accordance with the instant invention.
Figure 15B:
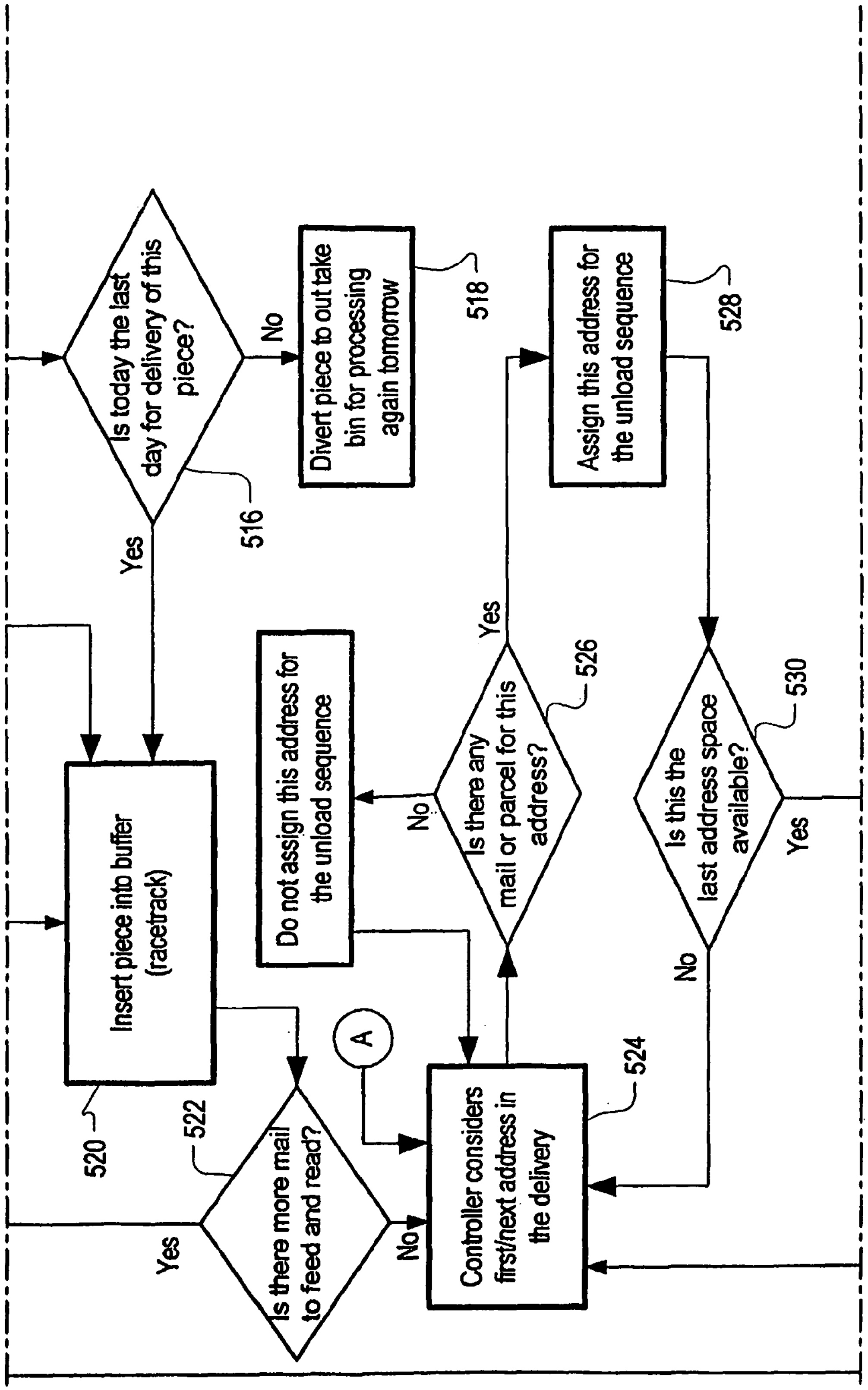
Figure 15C:
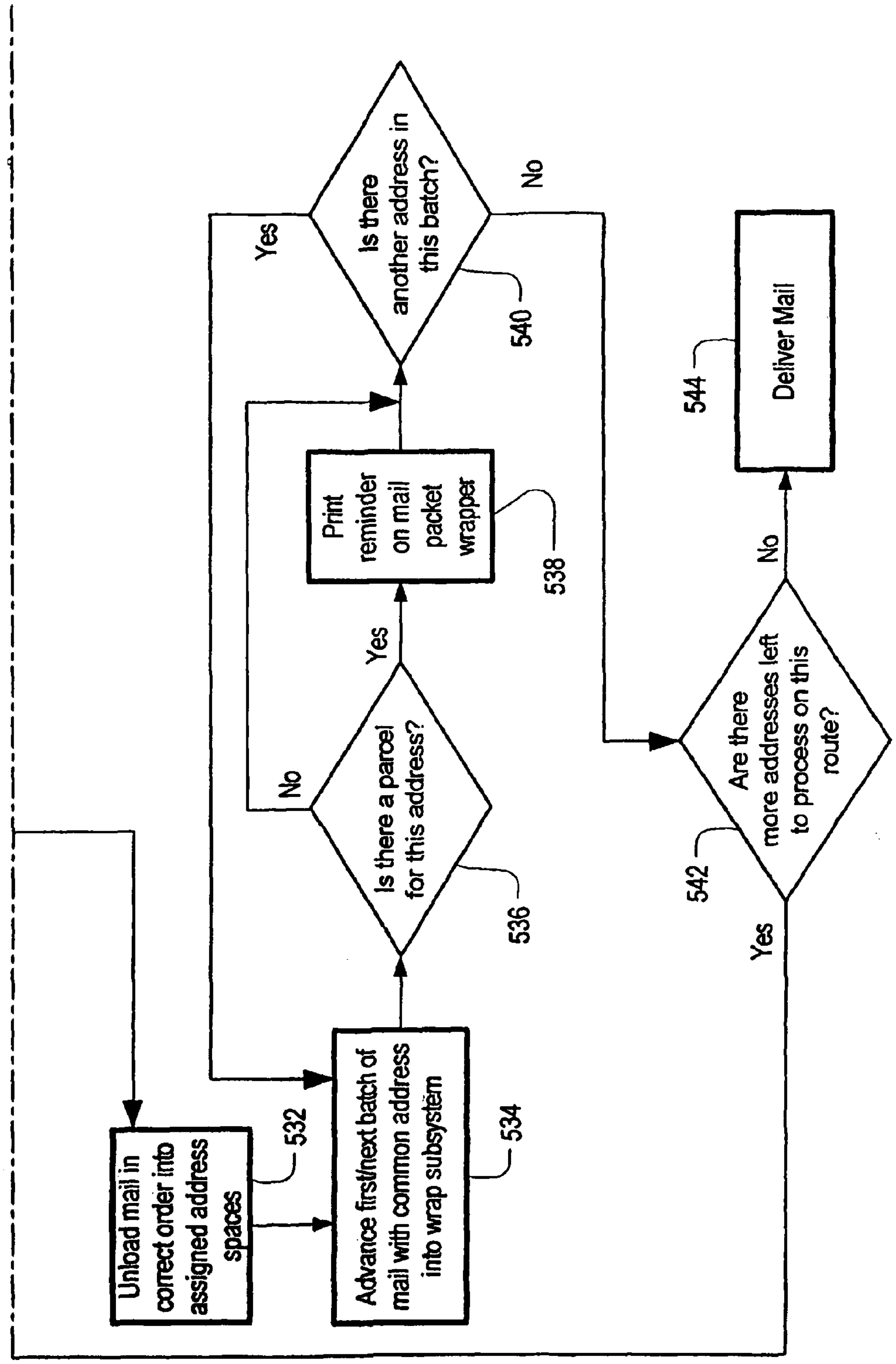

Turning now to the process 500 of FIGS. 15A through 15C, all mail except standard class mail (with three day delivery window) is loaded, fed, and read 502 into the sorter. Then a controller downloads 504 data on parcels for delivery today. It must be determined 506 whether there is space available for additional mail. If so, then a "deliver by" date is keyed in 508, and standard class mail is loaded, fed, and read (if not, then the process skips ahead to the circle at the left-hand-side of FIG. 15B). After the keying step 508, the first or next piece of standard class mail is fed 510 into the sorter and its address is read. Subsequently, several determinations 512, 514, and 516 are possible in order to determine if 512 there is other mail to be delivered to the address today, to determine if 514 there is a parcel to be delivered to the address in question, and/or to determine if 516 today is the last day for delivery of such a parcel. Unless the mail piece is diverted 518 for later processing, it will be inserted 520 into a buffer. When there is no more mail to read and feed 522, a controller proceeds 524 to consider a first or next address. If 526 there is mail (or at least one parcel) for the address in question, then the address is assigned 528 for an unload sequence, and if it is the last address space available then the mail is unloaded 532 in correct order into assigned address spaces.

A first or next batch of mail having a common address is advanced 534 into a wrap subsystem, and a reminder is printed 538 on the mail packet wrapper if 536 there is a parcel destined for this address. These steps 534-538 are repeated until 540 there are no more addresses in the batch. Even more of these steps are repeated until 542 there are no more addresses left to process on this route, at which time the mail is delivered 544.

Both of these innovations help make more efficient use the carrier's time in delivering mail. While the efficiencies are small—maybe only saving 2% of a carrier's time, when combined with other efficiencies described herein, the USPS may be in a position to reduce the overall cost of the last mile deliveries.

V. Carrier Delivery Sequence Sorter—Mail Piece Eject into Interim Stacker

The preceding descriptions disclose various aspects of the instant invention of a single pass carrier delivery sequence sorter. The following is a description of a further embodiment of the instant invention. This embodiment discloses one method for accomplishing the function of ejecting mail pieces from the buffer trays and stacking them in the interim unloading trays. This embodiment merges all the mail streams and sorts them by delivery sequence order, automatically unloads the sorter, then bundles the mail pieces to be delivered to each address and wraps them in a wrapper, then stacks these wrapped bundles into mail trays.

Because this product is intended to handle a broad latitude of mail piece types automatically, it relies on escorting the mail for most of the sorting path. Mail is fed either manually or automatically past an address reader, and is loaded into an endless loop of buffer trays (also referred to as "bin dividers") with one mail piece loaded into each divider. The controller figures out the correct order to unload the mail pieces from this array of bin dividers, then initiates the unload sequence. In order for this concept to accomplish all of its functions, one of the most important processing steps is to eject mail pieces from the array of buffer trays or bin dividers into interim unloading trays (also referred to as "unload stations"). As previously described, addresses are temporarily assigned to each of the interim unloading trays, and all the mail to the assigned addresses is unloaded into the interim unloading trays within one revolution of the endless loop of buffer trays.

Thus, it can be seen from the foregoing specification and attached drawings that the single sorting system and method of using the same of the instant invention provides an effective and convenient way to sort mail pieces. While the foregoing description has been described with regard to the USPS, the description applies as well for any Post.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. A sorting system for sorting a plurality of mail pieces that include standard class mail pieces and higher class mail pieces, the plurality of mail pieces being for delivery no earlier than an initial delivery date by carriers from a postal facility to final destination addresses, comprising:

means for collecting data about each of the plurality of mail pieces including data concerning the class of the mail piece and a latest delivery date if the class of the mail piece is standard class;

a plurality of holders, each holder dimensioned for receipt of one mail piece;

means for creating an association of the collected data concerning each mail piece with the respective one of the plurality of holders into which the mail piece is loaded;

withholding means, for withholding a mail piece from delivery on the initial delivery date to a final destination address, if the collected data associated with the respective holder indicates that the mail piece loaded in the respective holder is a standard class mail piece having a latest delivery date after the initial delivery date, provided that the collected data associated with the plurality of holders indicates that there are no other of the plurality of mail pieces addressed to the same destination address as said standard class mail piece and having either a higher class than standard class or having a latest delivery date on or before the initial delivery date; and a sorter for sorting the mail pieces that are not withheld based upon the collected data associated with each of said holders, so that the mail pieces are sorted according to their final destination addresses.

2. The sorting system of claim 1, wherein the withholding means is for withholding a mail piece contingent upon there being less than a threshold number of the standard class mail pieces destined for said destination address.

3. The sorting system of claim 1, wherein the sorting is performed on the initial delivery date.

4. The sorting system of claim 1, further comprising:

unloading means for unloading the sorted mail pieces that are to be delivered on the initial delivery date into mail trays;

wrapping means for wrapping the unloaded sorted mail pieces for delivery to each respective one of said final destination addresses, with a separate wrapper; and printing means for printing delivery information on each wrapper.

5. The sorting system of claim 4, wherein the delivery information indicates if there are any mail pieces external to the wrapped mail pieces that need to be delivered to the respective one of said final destination addresses.

6. The sorting system of claim 4, wherein the delivery information indicates how many mail pieces external to the wrapped mail pieces need to be delivered to the respective one of said final destination addresses.

7. The sorting system of claim 1, wherein the withholding means keeps the withheld mail pieces in their respective holders for sequence sorting at a later time.

8. The sorting system of claim 1, wherein the withholding means outsorts the withheld mail pieces from their respective holders for sequence sorting at a later time.

9. The sorting system of claim 1, wherein the withholding means further withholds the standard class mail piece from delivery, provided that the collected data associated with the plurality of holders indicates that there are no parcels addressed to the same destination address as said standard class mail piece.

10. The sorting system of claim 1, wherein the collecting means collects data about parcels for delivery on an initial delivery date from a database separate from the sorting system.

11. The sorting system of claim 1, wherein the withholding means outsorts the withheld mail pieces without loading them into one of the holders.

12. A method for sorting a plurality of mail pieces that include standard class mail pieces and higher class mail pieces, the plurality of mail pieces being for delivery no earlier than an initial delivery date by carriers from a postal facility to final destination addresses, comprising:

collecting data about each of the plurality of mail pieces including data concerning the class of the mail piece and a latest delivery date if the class of the mail piece is standard class;

loading each mail piece in a holder and associating the collected data concerning each mail piece with the respective one of the plurality of holders into which the mail piece is loaded;

withholding a mail piece from delivery on the initial delivery date to a final destination address, if the collected data associated with the respective holder indicates that the mail piece loaded in the respective holder is a standard class mail piece having a latest delivery date after the initial delivery date, provided that the collected data associated with the plurality of holders indicates that there are no other of the plurality of mail pieces addressed to the same destination address as the standard class mail piece and having either a higher class than standard class or having a latest delivery date on or before the initial delivery date; and sorting the mail pieces that are not withheld based upon the collected data associated with each of said holders so that the mail pieces are sorted according to their final destination addresses.

13. The method of claim 12, wherein the withholding step is contingent upon there being less than a threshold number of the standard class mail pieces destined for said destination address.

14. The method of claim 12 wherein the method is performed on the initial delivery date.

15. The method of claim 12, further comprising:

unloading the sorted mail pieces that are to be delivered on the initial delivery date into mail trays;

wrapping the unloaded sorted mail pieces, for delivery to each respective one of said final destination addresses with a separate wrapper; and printing delivery information on each wrapper.

16. The method of claim 15, wherein the delivery information indicates if there are any mail pieces external to the wrapped mail pieces that need to be delivered to the respective one of said final destination addresses.

17. The method of claim 15, wherein the delivery information indicates how many mail pieces external to the wrapped mail pieces need to be delivered to the respective one of said final destination addresses.

18. The method of claim 12, wherein the withholding step keeps the withheld mail pieces in their respective holders for sequence sorting at a later time.

19. The method of claim 12, wherein the withholding step outsorts the withheld mail pieces from their respective holders for sequence sorting at a later time.

20. The method of claim 12, wherein the withholding step outsorts the withheld mail pieces before the withheld mail pieces can be loaded into one of the holders.

* * * * *